US009008686B2

(12) United States Patent
Hannuksela et al.

(10) Patent No.: US 9,008,686 B2
(45) Date of Patent: Apr. 14, 2015

(54) COLLABORATIVE LOCATION/ORIENTATION ESTIMATION

(75) Inventors: Miska Hannuksela, Ruutana (FI); Pasi Ojala, Kirkkonummi (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 13/521,427

(22) PCT Filed: Jan. 12, 2010

(86) PCT No.: PCT/IB2010/050095
§ 371 (c)(1),
(2), (4) Date: Jul. 10, 2012

(87) PCT Pub. No.: WO2011/086419
PCT Pub. Date: Jul. 21, 2011

(65) Prior Publication Data
US 2012/0295637 A1    Nov. 22, 2012

(51) Int. Cl.
| H04W 24/00 | (2009.01) |
| G01S 5/00 | (2006.01) |
| G01S 3/803 | (2006.01) |
| G01S 3/808 | (2006.01) |
| G01S 5/18 | (2006.01) |

(52) U.S. Cl.
CPC ............ G01S 5/0072 (2013.01); G01S 3/8034 (2013.01); G01S 3/8083 (2013.01); G01S 5/186 (2013.01)

(58) Field of Classification Search
CPC ...... H04W 64/00; H04W 4/02; G01S 5/0252; G01S 5/14; H04M 1/72572; H04M 2250/10

USPC ............................................. 455/456.1–456.6
See application file for complete search history.

(56) References Cited

U.S. PATENT DOCUMENTS

| 6,704,652 B2 * | 3/2004 | Yi .................................. 701/470 |
| 7,277,692 B1 * | 10/2007 | Jones et al. ................. 455/412.1 |
| 7,551,695 B2 * | 6/2009 | Speth ........................... 375/341 |
| 2006/0172699 A1 * | 8/2006 | Goto ............................. 455/11.1 |
| 2006/0224300 A1 | 10/2006 | Shioya et al. |
| 2006/0281415 A1 * | 12/2006 | Koyanagi .................. 455/67.11 |
| 2008/0170717 A1 | 7/2008 | Liu et al. |
| 2010/0331009 A1 * | 12/2010 | Krishnamurthy et al. . 455/456.1 |

OTHER PUBLICATIONS

Office Action received for corresponding Chinese Application No. 201080061257.8, dated Jul. 2, 2013, 8 pages.
International Search Report received for corresponding Patent Cooperation Treaty Application No. PCT/IB2010/050095, dated Oct. 19, 2010, 8 pages.

(Continued)

*Primary Examiner* — Olumide T Ajibade Akonai
*Assistant Examiner* — Edward Zhang
(74) *Attorney, Agent, or Firm* — Alston & Bird LLP

(57) ABSTRACT

It is inter alia disclosed to estimate at least one of a location and an orientation of a first-type device (11) at least based on respective location estimates for one or more signal sources (10), wherein at least one location estimate for a signal source (10) of the one or more signal sources is determined at least based on respective signals from the signal source (10) received at one or more second-type devices (12) and respective locations of the one or more second-type devices (12), and respective position relationships between the one or more signal sources (10) and the first-type device (11).

17 Claims, 16 Drawing Sheets

(56) References Cited

OTHER PUBLICATIONS

Written Opinion received for corresponding Patent Cooperation Treaty Application No. PCT/IB2010/050095, dated Oct. 19, 2010, 7 pages.

International Preliminary Report on Patentability received for corresponding Patent Cooperation Treaty Application No. PCT/IB2010/050095, dated Oct. 19, 2010, 8 pages.

Chen, J.C. et al. "Maximum-Likelihood Source Localization and Unknown Sensor Location Estimation for Wideband Signals in the Near-Filed", IEEE Transactions on Signal Processing, vol. 50, No. 8, Aug. 2002, pp. 1843-1853 p.

Raykar V.C. et al. "Position Calibration of Microphones and Loudspeakers in Distributed Computing Platforms", IEEE Transactions on Speech and Audio Processing, vol. 13, No. 1, Jan. 2005, pp. 70-83.

Ji, W.-W. et al. "Locating ineffective sensor nodes in wireless sensor networks". IET Commuications, vol. 2, No. 3 pp. 432-439.

Sadler B.M. "Fundamentals of energy-constrained sensor network systems". IEEE Aerospace and Electronic Systems Magazine, vol. 20, No. 8, Aug. 2005, pp. 17-35.

Office Action for Chinese Application No. 201080061257.8 dated Aug. 26, 2014.

Office Action for Chinese Application No. 201080061257.8 dated Mar. 27, 2014.

* cited by examiner

COLLABORATIVE LOCATION/ORIENTATION ESTIMATION

RELATED APPLICATION

This application was originally filed as PCT Application No. PCT/IB2010/050095 filed Jan. 12, 2010.

FIELD

This invention relates to estimating a location and/or an orientation of a first-type device collaboratively with the help of at least one second-type device.

BACKGROUND

Location and orientation information of a device (for instance a mobile device) is important for location based service provision (e.g. navigation and information services) as well as for service enhancements.

As an example, accurate knowledge of the location and orientation of a device is required if the device is connected in an ad-hoc network for multi-view audiovisual content capture. In such a multi-view content capture operation, the device may for instance function as a camera, video camera or just as an audio recorder. The device may for instance be connected to the free viewpoint service provision as a content capture client. The knowledge about the viewpoint to the audiovisual source and the synchronisation of the captured content in multi-device system is important to efficiently store, analyse, process and represent the media.

As a further example, augmented reality services require accurate location and orientation of the user of a device to enable meaningful rendering of the media items within the given location.

SUMMARY OF SOME EMBODIMENTS OF THE INVENTION

In a first aspect of the present invention, a method is disclosed, comprising estimating at least one of a location and an orientation of a first-type device at least based on
- respective location estimates for one or more signal sources, wherein at least one location estimate for a signal source of the one or more signal sources is determined at least based on respective signals from the signal source received at one or more second-type devices and respective locations of the one or more second-type devices, and
- respective position relationships between the one or more signal sources and the first-type device.

In this first aspect of the present invention, furthermore a computer program is disclosed, comprising program code for performing the method according to the first aspect of the present invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

In this first aspect of the present invention, furthermore a computer-readable medium is disclosed, having a computer program according to the first aspect of the present invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a Random-Access Memory (RAM) or a Read-Only Memory (ROM). The computer-readable medium may for instance be a tangible medium, for instance a tangible storage medium. A computer-readable medium is understood to be readable by a computer, such as for instance a processor.

In this first aspect of the present invention, furthermore an apparatus is disclosed, configured to perform the method according to the first aspect of the present invention.

In this first aspect of the present invention, furthermore an apparatus is disclosed, comprising means for estimating at least one of a location and an orientation of a first-type device at least based on
- respective location estimates for one or more signal sources, wherein at least one location estimate for a signal source of the one or more signal sources is determined at least based on respective signals from the signal source received at one or more second-type devices and respective locations of the one or more second-type devices, and
- respective position relationships between the one or more signal sources and the first-type device.

In this first aspect of the present invention, furthermore an apparatus is disclosed, comprising at least one processor; and at least one memory including computer program code, the at least one memory and the computer program code configured to, with the at least one processor, cause the apparatus at least to estimate at least one of a location and an orientation of a first-type device at least based on
- respective location estimates for one or more signal sources, wherein at least one location estimate for a signal source of the one or more signal sources is determined at least based on respective signals from the signal source received at one or more second-type devices and respective locations of the one or more second-type devices, and
- respective position relationships between the one or more signal sources and the first-type device.

The computer program code included in the memory may for instance at least partially represent software and/or firmware for the processor. Non-limiting examples of the memory are a RAM or ROM that is accessible by the processor.

The apparatuses according to the first aspect of the present invention may for instance be comprised in the first-type device, in one of the one or more second-type devices or in another device, such as for instance a unit that implements a service (e.g. a server), such as for instance a location service.

According to the first aspect of the present invention, a location and/or an orientation of a first-type device is estimated at least based on respective location estimates for one or more signal sources and respective position relationships between the one or more signal sources and the first-type device. This estimated location and/or orientation may for instance be of interest if the first-type device is connected in an ad-hoc network for multi-view audiovisual content capture, or may be used in other location/orientation-based services like navigation or augmented reality, to name but a few non-limiting examples.

Therein, the location may for instance be expressed in terms of a pre-defined coordinate system (e.g. in geodetic coordinates). The orientation may for instance be understood as the arrangement of the first-type device (for instance the arrangement of one of its axes or planes) with respect to a pre-defined coordinate system, which may for instance be the same coordinate system in which the location is expressed, or a different coordinate system.

The first-type device and the one or more second-type devices may for instance be portable electronic devices, such as for instance mobile phones, personal digital assistants or media-rendering devices. A non-limiting example of a first-type device is a "basic" device that is not equipped with accurate positioning functionality (such as for instance satellite-based positioning functionality). A non-limiting example of a second-type device is a "sophisticated" device that is equipped with accurate positioning functionality (such as for instance satellite-based positioning functionality).

Estimation of the location and/or orientation exploits one or more signal sources that emit respective signals that can be received at the second-type devices (and, in some embodiments of the present invention, also at the first-type device). Non-limiting examples of such signals are acoustic, optic, electric, magnetic or electromagnetic signals, to name but a few non-limiting examples, and the signal sources may then be embodied accordingly to be able to produce such signals.

The signal sources may be deployed in the environment in which the first-type and second-type devices are located on purpose (for instance according to a specific plan), or may be present in the environment anyway. In some embodiments of the present invention, one or more signal sources may also be comprised in the first-type device. However, some or all signal sources may also be not comprised in the first-type device and may also not be connected to or dependent on the first-type device. For instance, one signal source may be comprised in the first-type device, and the other signal source may not be comprised in the first-type device.

It should be noted that, even when stemming from the same signal source (and thus being identical when being transmitted by the signal source), signals from a signal source respectively received at different devices (e.g. at the first-type device and the second-type device, or at different second-type devices may differ, for instance due to different reception times and/or different signal propagation conditions towards the different devices (including different propagation delays).

Estimation of the location and/or orientation is based on respective location estimates for the one or more signal sources (i.e. there is for instance one location estimate per signal source) and respective position relationships between the one or more signals sources and the first-type device (i.e. there is for instance one position relationship between each signal source and the first-type device). Consequently, estimation may be based on a single signal source only, or on two or more signal sources.

The location estimates for the one or more signal sources may for instance at least partially be expressed as a region or area or also in a statistical sense, for instance by a probability density function. A location estimate for a signal source is understood throughout this specification as an estimate of the location of a signal source.

At least one location estimate for a signal source is determined at least based on respective signals from a signal source received at one or more second-type devices (i.e. for instance one signal transmitted from the signal source is received at each second-type device, thus yielding a respective received signal per second-type device, wherein the received signals at different second-type devices can be the same or different (for instance differently delayed)) and respective locations of the one or more second-type devices (i.e. there is for instance one location per second-type device).

The location of the second-type device may for instance be determined by using a locating technique, such as for instance a satellite-based positioning technique (e.g. according to a Global Navigation Satellite System (GNSS) such as for instance the Global Positioning System (GPS), Galileo or the GLONASS system), a cell-ID-based positioning system or a positioning system that is based on reception of beacon (e.g. base station) signals and according triangulation, to name but a few non-limiting examples. The location of the second-type device may equally well be known a priori, for instance in case that the second-type device is fixed (non-moving). The location may then for instance be considered to have been determined only once, for instance during the installation of the second-type device. The location of the second-type device may be determined by the second-type device itself, or by another device (such as for instance a server that is involved in the estimation of the location and/or orientation of the first-type device).

A location estimate for a signal source may for instance be determined by estimating a direction and/or a distance between a second-type device and the signal source and combining this estimated direction and/or distance and the location of the second-type device. The direction may for instance be estimated based on the signal received at the second-type device. The distance may also be estimated based on the signal received at the second-type device, but may equally well be estimated as a fixed (e.g. pre-defined) value, for instance as a maximum possible distance with respect to a sensitivity of the one or more sensors used for receiving the signal. In any case, the location estimate for the signal source may be considered to be determined at least based on the signal of the signal source received at the second-type device because the signal source to which the location estimate pertains (and that thus identifies the location estimate) may only be differentiated from other signal sources by its signal.

Therein, it should be noted that, in case of several signal sources emitting signals, the respective signals from these several signal sources are superposed at a receiving second-type device and may have to be separated to allow estimation of the respective directions and/or distances towards the signal sources. This separation may for instance be jointly performed with the estimation, for instance by using an Expectation-Maximisation (EM) algorithm or any other type of suited algorithm.

If several second-type devices have received signals from the same signal source, a location estimate for the signal source may be obtained for each second-type device, and these location estimates may then for instance be combined (e.g. by forming cross-sections) into a single location estimate for the signal source to be used for the estimating of the location and/or orientation of the first-type device.

The estimating of the location and/or orientation is also based on respective position relationships between the one or more signal sources and the first-type device (i.e. there is for instance one position relationship with respect to the first-type device for each signal source).

Therein, a position relationship may for instance be understood as a relationship that expresses a relative positioning/arrangement of two objects (in this case the signal source and the first-type device) with respect to each other. Non-limiting examples of such a position relationship may for instance be a direction between two objects, or a distance between two objects, or a direction and a distance between two objects, wherein both the distance and the direction may represent ranges or may be expressed in a statistical sense, for instance as probability density functions).

A position relationship may for instance be known a priori, for instance since the signal source is comprised in the first-type device, so that the locations of both can for instance be assumed to be the same or substantially the same.

Alternatively, a position relationship may be estimated based on a signal from the signal source received at the first-type device, for instance by estimating, based on the signal from the signal source received at the first-type device, a direction and/or a distance between the first-type device and the signal source.

It is of course also possible that both a priori known position relationships and estimated position relationships are used, for instance if only one signal source is comprised in the first-type device (and is thus associated with an a priori known position relationship) and one or more other signal sources are outside of the first-type device (and are thus associated with estimated position relationships).

At least based on the respective location estimates for the one or more signal sources and the respective position relationships between the one or more signal sources and the first-type device (which are either known a priori or estimated), the position and/or orientation of the first-type device is estimated.

This estimation may for instance be performed by combining the location estimates and the position relationships that pertain to the same signal sources to obtain signal-source-specific constraints (candidates) for the location and/or orientation of the first-type device, and merging these signal-source-specific constraints to arrive at a final estimate of the location and/or orientation of the first-type device.

It should be noted that there may exist further signal sources than the one or more signal sources actually used for the estimation of the location and/or orientation of the first-type device.

The first aspect of the present invention thus may be considered to exploit that respective signals from one or more signal sources received by a second-type device (which is capable of accurately determining its location and/or orientation by itself), together with at least a location of the second-type device determined by the second-type device, allow determining location estimates for the one or more signal sources (for instance by estimating directions and/or distances towards the signal sources and combining these directions and/or distances with location of the second-type device). Based on these location estimates, and on position relationships (e.g. directions and/or distances) between these signal sources and a first-type device (which is not capable of accurately determining its location and/or orientation by itself), the location and/or orientation of the first-type device can be estimated. The position relationships may be known a priori, for instance in cases where a signal source is part of the first-type device, and/or may be estimated from signals received by the first-type device from the one or more signal sources. In any case, the first-type device uses collaboration with at least one second-type device so that an estimate of the location and/or orientation of the first-type device can be obtained. According to an embodiment of the first aspect of the present invention, the one or more signal sources are sound sources that emit respective audio signals. The sound sources may for instance be human beings that produce sound by, for instance, talking. Other non-limiting examples of sound sources are loudspeakers. The audio signals may for instance be received at the second-type devices (and also at the first-type device, in case that the signal source is not comprised in the first-type device) with one or more microphones. Using sound sources as signal sources may for instance be advantageous since capturing directional audio may be easier than capturing, for instance, directional radio signals. The frequencies of audio signals are lower than the frequencies of, for instance, radio signals, and as a result, the amount of data to analyse may be far less. Furthermore, the required antenna size might also be a problem for certain radio frequencies, in contrast to the comparably small microphones for audio capture. Furthermore, the audio environment and the sound sources are available around the first-type and second-type devices by nature, so that actual deployment of sound sources for location and/or orientation estimation may not be necessary. It may also not be necessary to trigger signal emission of such sound sources, since they may produce the sound signals on their own behalf (for instance if the sound sources are human beings that emit audio signals by talking).

According to an embodiment of the first aspect of the present invention, the at least one location estimate for the signal source is determined at least based on the respective locations of the one or more second-type devices, respective orientations of the one or more second-type devices and respective estimates of respective directions between the signal source and the one or more second-type devices determined at least based on the respective signals received at the one or more second-type devices. It may also be the case that more than one or even all of the respective location estimates are determined in the same way as the at least one location estimate.

An estimate of a direction between a signal source and a (single) second-type device may for instance be determined based on the signal from the signal source received at the second-type device if the second-type uses two or more sensors (e.g. microphones in case of an audio signal) for receiving the signal. An estimate of the direction of the signal source relative to the array of two or more sensors then may be calculated based on the delays of the reception outputs of the sensor array caused by the received signal, the geometry (spacing) of the sensor array and the signal propagation speed. This (relative) direction may then be transformed into an absolute direction by considering the orientation of the second-type device (which may for instance be determined from a magnetometer or any other type of compass). This absolute direction may then be combined with the location of the second-type device as an anchor point to form a ray that then represents the location estimate. Therein, the ray may for instance also be represented by a coil or sector, for instance to account for estimation errors, and then this coil or sector may represent the location estimate.

If signals of the same signal source have been received at several second-type devices, the respective location estimates of these several devices may for instance be combined to arrive at a single location estimate for this signal source. An example for this combination of location estimates of several second-type devices may be averaging. As another example, basic triangulation could be used as a technique for combining location estimates of several second-type devices.

If signals from more than one signal source are received (in superposed form) at the second-type device, it may be necessary to separate these signals before estimating the respective directions or to consider the presence of multiple signals when estimating the respective directions.

The at least one location estimate for the signal source may for instance further be based on respective estimates of respective distances between the signal source and the one or more second-type devices.

A distance between a signal source and a second-type device may for instance be estimated based on the power level of the signal from the signal source received at the second-type device. Therein, it may be advantageous that the transmission power of the signal source (or at least a part thereof)

is known or can be estimated. A transmission power of a signal source may for instance be known if the signal source is comprised in the first-type device. If signals from multiple signal sources are jointly received at the second-type device, according separation of the signals may have to be performed before or during estimation of the distance. A maximum distance of a signal source may also be derived from the sensitivity of the one or more sensors used to receive the signal from the signal source. The estimated distance (or estimated maximum possible distance) between the signal source and the second-type device may then be used to reduce the direction-based location estimate described in the previous embodiment. For instance, if the direction-based location estimate has the form of a ray, the estimated direction would allow reducing the location estimate to a point on this ray. However, also the estimated distance may be represented by a certain range to account for estimation errors.

According to an embodiment of the first aspect of the present invention, the at least one location estimate for the signal source is determined further based on at least one previously determined location estimate for the signal source. For instance, instead of using a currently determined location estimate as a result, a cross-section of the previously determined location estimate and the currently determined location estimate could be used as a result. This may for instance be advantageous if the signal sources are known or can be assumed to be non-moving or if the frequency at which new location estimates for the signal sources are determined is large enough so that a signal source can be assumed to have only insignificantly moved between two location estimates.

According to an embodiment of the first aspect of the present invention, the at least one location estimate for the signal source is determined further based on level differences between respective signals from at least two of the one or more signal sources received at a second-type device of the one or more second-type devices. The level differences may for instance be differences in the respective received power levels of signals received from the at least two signal sources. Large level differences of signals received from two signal sources may for instance indicate that one of these signal sources has to be farther apart from the location of the second-type device than the other signal source.

According to an embodiment of the first aspect of the present invention, the respective signals received at the second-type devices are analysed to decide if they stem from the same signal source and are thus jointly useable as a basis for determining the at least one location estimate for the signal source. The analysis may for instance comprise comparing the signals received at different second-type devices, for instance by cross-correlation. In this comparison, time shifts of the received signals which may for instance be due to different signal propagation delays may be taken into account. If signals from several signal sources are received at each second-type device, these signals may be separated before conducting the analysis.

Combining (for instance by averaging or by forming cross-sections) location estimates for the same signal source from two or more second-type devices may significantly improve the quality of this location estimate and thus also the quality of the estimate of the location and/or orientation of the first-type device that depends on this location estimate.

According to an embodiment of the first aspect of the present invention, at least one of the one or more signal sources is comprised in the first-type device, and a position relationship between the at least one signal source comprised in the first-type device and the first-type device is known a priori (e.g. without a need for estimation), for instance at least at the first-type device. The signal source comprised in the first-type device may for instance be the only signal source used for estimating the location and/or orientation of the first-type device. Having a signal source in the first-type device may account for cases where no external signal sources, i.e. signal sources that are not comprised in the first-type device, are present and thus ensures that the location and/or orientation of the first-type device can be estimated even if (at least temporarily) there are no external signal sources present. Equally well, this estimating may be further based on one or more further signal sources that are not comprised in the first-type device. The signal emitted by the signal source comprised in the first-type device may then be received by the one or more second-type devices, and this one or more respective received signals then form an at least partial basis for the determining of the location estimate for this signal source. Since this signal source is known to be comprised in the first-type device, the location estimate then may be considered as an estimate of the location of the first-type device.

The estimating of the at least one of the location and the orientation of the first-type device may then for instance be performed by the first-type device. The signal source in the first-type device may then for instance emit a signal that is received by the one or more second-type devices. The signal emitted by the signal source comprised in the first-type device may for instance be optimized to allow proper estimation of the direction and/or distance towards the first-type device by the second-type devices receiving this signal. The signal emitted by the signal source comprised in the first-type device may for instance be emitted with a pre-defined transmission power level to allow estimation of the distance between the second-type device that receives this signal and the first-type device, for instance based on a comparison of the power level of the received signal and the pre-defined transmission power level. Using such a pre-defined power level may for instance be advantageous if the distance between the signal source comprised in the first-type device and the second-type device is estimated by the second-type device. Alternatively, if the distance is estimated by the first-type device, for instance based on information on the signal (of the signal source comprised in the first-type device) received at the second-type device, any transmission power level may be used; it may then be sufficient that the unit of the first-type device that performs the estimation of the distance is provided with information on the transmission power level that was used at the signal source for emission of the signal.

At the first-type device, then either the respective location estimates for the one or more signal sources or information based on which the respective location estimates (e.g. directions and/or distances) for the one or more signal sources are derivable may be received from at least one of the one or more second-type devices and a service to which the one or more second-type devices provided one of the respective location estimates for the one or more signal sources and information based on which the respective location estimates for the one or more signal sources are derivable.

In the example case that the signal source comprised in the first-type device is the only signal source from which the one or more second-type devices received a signal, the location estimates pertaining to this signal source then represent a location estimate for the first-type device. If the one or more second-type device and the first-type device received respective signals also from one or more further signal sources (not comprised in the first-type device), information on these received signals may additionally be used by the first-type device to estimate the location and/or orientation of the first-type device.

According to an embodiment of the present invention, at least one position relationship between a signal source of the one or more signal sources and the first-type device is estimated at least based on a signal from the signal source received at the first-type device.

The position relationship may for instance be estimated based on the signal from the signal source received at the first-type device by estimating a direction and/or a distance between the first-type device and the signal source. The direction may for instance be estimated based on the signal received at the first-type device. The distance may also be estimated based on the signal received at the first-type device, but may equally well be estimated as a fixed (e.g. pre-defined) value, such as for instance as the maximum possible distance, for instance with respect to the sensitivity of the one or more sensors used for receiving the signal. The position relationship may then be considered to be estimated at least based on the signal of the signal source received at the first-type device, because the signal source to which the estimate of the position relationship pertains (and that thus identifies the estimate of the position relationship) may only be differentiated from other signal sources by its signal. Therein, it should again be noted that in case of several signal sources emitting signals, the respective signals from these several signal sources are superposed at the receiving first-type device and may have to be separated to allow estimation of the respective directions and/or distances of the signal sources. This separation may for instance be jointly performed with the estimation, for instance by using an Expectation-Maximisation (EM) algorithm or any other type of suited algorithm.

The at least one position relationship between the signal source and the first-type device may for instance be estimated at least based on an estimate of a direction between the signal source and the first-type device determined at least based on the signal received at the first-type device. It may also be the case that more than one or even all of the respective estimates of the position relationships are determined in the same way as the at least one estimate of the position relationship.

An estimate of a direction between a signal source and a first-type device may for instance be determined based on the signal from the signal source received at the first-type device if the first-type device uses two or more sensors (e.g. microphones in case of an audio signal) for receiving the signal. An estimate of the direction of the signal source relative to the array of two or more sensors then may be calculated based on the delays of the outputs of the sensor array caused by the received signal, the geometry (spacing) of the sensor array and the signal propagation speed. This relative direction may be transformed into an absolute direction by considering the orientation of the first-type device, if this orientation is available (for instance if it can be determined from a magnetometer or any other type of compass). This absolute direction then constitutes the estimated position relationship. Equally well, the relative direction may constitute the estimated position relationship. Relative directions may for instance already be valuable for the estimation of the location and/or orientation of the first-type device if respective relative directions between the first-type device and at least two signal sources are available, because both relative directions refer to the same sensor array and are thus fixed with respect to each other.

Once again, if signals from more than one signal source are received (in superposed form) at the first-type device, it may be necessary to separate these signals before estimating the respective directions or to consider the presence of multiple signals when estimating the respective directions.

The at least one position relationship between the signal source and the first-type device may for instance be estimated further based on an orientation of the first-type device. Knowledge on the orientation of the first-type device (which is for instance obtainable from a compass) allows transforming relative directions that can be estimated based on a signal from a signal source received at a sensor array of the first-type device relative to the sensor array into an absolute direction, which then may constitute the estimated position relationship. Even if only a location estimate for a single signal source is available, such an absolute direction (as estimate of the position relationship) between this signal source and the first-type device may already yield an accurate estimate of the location of the first-type device.

The at least one position relationship between the signal source and the first-type device may for instance be estimated further based on an estimate of a distance between the signal source and the first-type device. Consideration of the distance may even further improve the quality of the estimate of the location and/or orientation of the first-type device. The distance may for instance be estimated from the signal received at the first-type device (for instance based on the received power level thereof). In case of multiple signal sources, according separation of their signals received at the first-type device may be necessary before the estimation process or consideration of the fact that there are several signal sources in the estimation process. Equally well, the estimate of the distance may be estimated as a fixed (e.g. pre-defined) value, such as for instance as the maximum possible distance, for instance with respect to the sensitivity of the one or more sensors used for receiving the signal.

The estimating of the at least one of the location and the orientation of the first-type device may further be based on level differences between respective signals from at least two of the one or more signal sources received at the first-type device. The level differences may for instance be differences in the respective received power levels of signals received from the at least two signal sources. Such information may be used as a further constraint for the estimating of the at least one of the location and the orientation of the first-type device. Exploiting knowledge on level differences is for instance advantageous in situations where only relative directions from the first-type device to two or more signal sources (with known locations) are known, since the ambiguity in the location and/or orientation of the first-type device may then be resolvable.

Signal reception at the first-type device and the one or more second-type devices may for instance be one of continued and repeated until a pre-defined number of signal sources is considered to be present as a basis for the estimating of the at least one of the location and the orientation of the first-type device or until a pre-defined accuracy of the estimation of the at least one of the location and the orientation of the first-type device has been achieved. Reception of signals from the one or more signal sources is thus either continued or repeated until either a pre-defined number of signal sources is considered to be present or until a pre-defined estimation accuracy is reached. Further continuation or repetition of the signal reception may for instance be useful if the signal sources were not transmitting before or if not enough signal sources were transmitting before.

The estimating of the at least one of the location and the orientation of the first-type device may for instance be performed by the first-type device.

This may further comprise receiving, at the first-type device, respective signals from the one or more signal sources, determining, at the first-type device, the respective estimates of the respective position relationships between the one or more signal sources and the first-type device based on the received signals, and receiving, at the first-type device, one of the respective location estimates for the one or more signal sources and information based on which the respective location estimates for the one or more signal sources are derivable from at least one of the one or more second-type devices and a service to which the one or more second-type devices provided one of the respective location estimates for the one or more signal sources and information based on which the respective location estimates for the one or more signal sources are derivable. The service may for instance be executed by an apparatus, such as for instance a server. The information based on which the respective location estimates for the one or more signal sources are derivable may for instance be the respective signals received by the second-type devices (wherein in case of signals from multiple signal sources being received at a second-type device, the superposition of these signals may be sent to the first-type device) and the respective locations of the second-type devices. Instead of the respective signals received by the second-type devices, also a parameterization of these signals may be sent to the first-type device.

Some or all of the information received by the first-type device may for instance have been scrambled for security and/or privacy reasons (which may be particularly important if audio signals are received).

According to an embodiment of the first aspect of the present invention, the estimating of the at least one of the location and the orientation of the first-type device is performed by the second-type device.

This may comprise receiving, at the second-type device, one of the respective position relationships between the one or more signal sources and the first-type device and information based on which the respective position relationships between the one or more signal sources and the first-type device are derivable, obtaining, at the second-type device, a location of the second-type device, receiving, at the second-type device, respective signals from one or more signal sources; and determining, at the second-type device, respective location estimates for the one or more signal sources at least based on the received signals from the one or more signal sources and the obtained location of the second-type device.

The information based on which the respective position relationships between the one or more signal sources and the first-type device are derivable may for instance be the respective signals received by the first-type device from the one or more signal sources (wherein in case of signals from multiple signal sources being received at the first-type device, the superposition of these signals may be sent to the service). Instead of the respective signals received by the first-type device, also a parameterization of these signals may be sent to the service.

The estimating of the at least one of the location and the orientation of the first-type device at the second-type device may further comprise receiving, at the second-type device, one of respective location estimates for the one or more signal sources and information based on which the respective location estimates for the one or more signal sources are derivable from at least one of at least one other second-type device of the one or more second-type devices and a service to which the at least one other second-type device provided one of the respective location estimates for the one or more signal sources and the information based on which the respective location estimates for the one or more signal sources are derivable, and the respective location estimates are then determined at the second-type device further based on the received one of the respective location estimates for the one or more signal sources and the information based on which the respective location estimates for the one or more signal sources are derivable.

Some or all of the information received by the second-type device may for instance have been scrambled for security and/or privacy reasons (which may be particularly important if audio signals are received).

According to an embodiment of the first aspect of the present invention, the estimating of the at least one of the location and the orientation of the first-type device is performed by a service, for instance a location service. The service may for instance be executed by an apparatus, such as for instance a server.

This may further comprise receiving, by the service, one of the respective location estimates for the one or more signal sources and information based on which the respective location estimates for the one or more signal sources are derivable from the one or more second-type devices, and receiving, by the service, one of the respective position relationships between the one or more signal sources and the first-type device and information based on which the respective position relationships between the one or more signal sources and the first-type device are derivable.

The information based on which the respective location estimates for the one or more signal sources are derivable may for instance be the respective signals received by the second-type devices (wherein in case of signals from multiple signal sources being received at a second-type device, the superposition of these signals may be sent to the service) and the respective locations of the second-type devices. Instead of the respective signals received by the second-type devices, also a parameterization of these signals may be sent to the service.

The information based on which the respective position relationships between the one or more signal sources and the first-type device are derivable may for instance be the respective signals received by the first-type device from the one or more signal sources (wherein in case of signals from multiple signal sources being received at the first-type device, the superposition of these signals may be sent to the service). Instead of the respective signals received by the first-type device, also a parameterization of these signals may be sent to the service.

Some or all of the information received by the service may for instance have been scrambled for security and/or privacy reasons (which may be particularly important if audio signals are received).

According to an embodiment of the first aspect of the present invention, the estimating of the at least one of the location and the orientation of the first-type device comprises considering at least those of the respective location estimates and the respective position relationships that pertain to the same signal sources of the one or more signal sources for setting up signal-source-specific constraints for the at least one of the location and the orientation of the first-type device, and merging at least the signal-source-specific constraints to obtain an estimate of the at least one of the location and the orientation of the first-type device.

The respective location estimates and the respective position relationships that pertain to the same signal sources may for instance be identified based on an analysis (e.g. a comparison, for instance by forming cross-correlations) of the respective signals emitted by the one or more signal sources (and received at the first-type device and the one or more second-type devices).

According to an embodiment of the first aspect of the present invention, the estimating of the at least one of the location and the orientation of the first-type device is further based on an estimated location of the first-type device. The estimated location may for instance have been estimated by the first-type device. The estimated location may for instance be estimated by using a cell-ID-based location technique in a cellular communication system (e.g. a technique in which the first-type device knows the ID of the cell it is currently associated with an also knows the position and extension of the cell, without however knowing where exactly in this cell the first-type device is currently located). The estimated location may for instance have been estimated by using a location technique that achieves coarser estimation accuracy than a satellite-based location technique. The estimated location may for instance be determined based on a non-satellite-based location technique. The estimated location may for instance be used as a further constraint for the estimating of the at least one of the location and the orientation of the first-type device.

According to an embodiment of the first aspect of the present invention, the estimating of the at least one of the location and the orientation of the first-type device is further based on at least one of a previously estimated location and a previously estimated orientation. These previous estimates may for instance stem from a previous step of estimating the at least one of the location and the orientation of the first-type device. For instance, instead of using a currently determined location estimate as a result, a cross-section of the previously determined location estimate and the currently determined location estimate could be used as a result. This may for instance be advantageous if the first-type device is known or can be assumed to be non-moving or if the frequency at which new location estimates for the first-type device are determined is large enough so that the first-type device can be assumed to have only insignificantly moved between two location estimates.

According to an embodiment of the first aspect of the present invention, wherein the first-type device triggers signal reception at the one or more second-type devices in one of a direct manner and an indirect manner. The signal reception (of the signals from the signal sources) may for instance be triggered indirectly by sending a request to a service that then triggers the one or more second-type devices, or directly by sending (e.g. broadcasting) a request to the one or more second-type devices (for instance to those with the same cell-ID).

According to an embodiment of the first aspect of the present invention, in case that it is determined that, among one or more available location estimates for one or more signal sources and among available position relationships between one or more signal sources and the first-type device, not even one of the available location estimates and one of the available position relationship pertain to the same signal source, action is taken to trigger signal reception at at least one second-type device that has not yet contributed to the available location estimates. Involving a further second-type device into the estimation process may for instance be useful if—due to lack of match between the available location estimates and the available position relationship estimates—it is considered that the first-type device and the second-type devices already involved are not in the same environment. The further second-type device then may for instance be selected to be in a neighborhood (for instance in a neighboring cell in case of a cellular system).

In a second aspect of the present invention, a method is disclosed, the method comprising receiving, at a first-type device, a signal from a signal source of one or more signal sources to serve as an at least partial basis for estimating a position relationship between the signal source and the first-type device, wherein an estimate of at least one of a location and an orientation of the first-type device is derivable at least based on respective position relationships between the one or more signal sources and the first-type device and respective location estimates for the one or more signal sources, and wherein at least one location estimate for a signal source of the one or more signal sources is determinable at least based on respective signals from the signal source received at one or more second-type devices and respective locations of the one or more second-type devices.

In this second aspect of the present invention, furthermore a computer program is disclosed, comprising program code for performing the method according to the second aspect of the present invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

In this second aspect of the present invention, furthermore a computer-readable medium is disclosed, having a computer program according to the second aspect of the present invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a Random-Access Memory (RAM) or a Read-Only Memory (ROM). The computer-readable medium may for instance be a tangible medium, for instance a tangible storage medium. A computer-readable medium is understood to be readable by a computer, such as for instance a processor.

In this second aspect of the present invention, furthermore an apparatus is disclosed, configured to perform the method according to the second aspect of the present invention.

In this second aspect of the present invention, furthermore an apparatus is disclosed, comprising means for receiving, at a first-type device, a signal from a signal source of one or more signal sources to serve as an at least partial basis for estimating a position relationship between the signal source and the first-type device, wherein an estimate of at least one of a location and an orientation of the first-type device is derivable at least based on respective position relationships between the one or more signal sources and the first-type device and respective location estimates for the one or more signal sources, and wherein at least one location estimate for a signal source of the one or more signal sources is determinable at least based on respective signals from the signal source received at one or more second-type devices and respective locations of the one or more second-type devices.

In this second aspect of the present invention, furthermore an apparatus is disclosed, comprising at least one processor; and at least one memory including computer program code, the at least one memory and the computer program code configured to, with the at least one processor, cause the apparatus at least to receive, at a first-type device, a signal from a signal source of one or more signal sources to serve as an at least partial basis for estimating a position relationship between the signal source and the first-type device, wherein an estimate of at least one of a location and an orientation of the first-type device is derivable at least based on respective position relationships between the one or more signal sources and the first-type device and respective location estimates for the one or more signal sources, and wherein at least one location estimate for a signal source of the one or more signal sources is determinable at least based on respective signals from the signal source received at one or more second-type devices and respective locations of the one or more second-type devices.

For this second aspect of the present invention, the above description of the first aspect of the present invention and of its embodiments equally applies. In particular, all features and advantages of the first aspect of the present invention (including its embodiments) shall be understood to be disclosed in connection with the second aspect of the present invention as well. Therein, the estimated position relationship is one of the respective position relationships between the one or more signal sources and the first-type device based on which the estimate of the location and/or orientation of the first-type device is derivable.

According to an embodiment of the second aspect of the present invention, information related to the signal received at the first-type device is communicated from the first-type device to one of a service and a second-type device of the second-type devices, wherein the one of the service and the second-type device is configured to estimate the at least one of the location and the orientation of the first-type device based on the information related to the signal received at the first-type device and the respective location estimates for the one or more signal sources. The information related to the signal received at the first-type device may for instance be the received signal itself, or a sum signal that contains this received signal and furthermore respective signals from further signal sources received at the first-type device, or a parameterization of the received signal, or a parameterization of some or all signals contained in the sum signal, to name but a few non-limiting examples. The service may for instance be executed by an apparatus, such as for instance a server.

In a third aspect of the present invention, a method is disclosed, comprising receiving, at a second-type device, a signal from a signal source of one or more signal sources to serve, together with at least a location of the second-type device, as an at least partial basis for determining a location estimate for the signal source, wherein an estimate of at least one of a location and an orientation of a first-type device is derivable at least based on respective location estimates for the one or more signal sources, and respective position relationships between the one or more signal sources and the first-type device.

In this third aspect of the present invention, furthermore a computer program is disclosed, comprising program code for performing the method according to the third aspect of the present invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

In this third aspect of the present invention, furthermore a computer-readable medium is disclosed, having a computer program according to the third aspect of the present invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a Random-Access Memory (RAM) or a Read-Only Memory (ROM). The computer-readable medium may for instance be a tangible medium, for instance a tangible storage medium. A computer-readable medium is understood to be readable by a computer, such as for instance a processor.

In this third aspect of the present invention, furthermore an apparatus is disclosed, configured to perform the method according to the third aspect of the present invention.

In this third aspect of the present invention, furthermore an apparatus is disclosed, comprising means for receiving, at a second-type device, a signal from a signal source of one or more signal sources to serve, together with at least a location of the second-type device, as an at least partial basis for determining a location estimate for the signal source, wherein an estimate of at least one of a location and an orientation of a first-type device is derivable at least based on respective location estimates for the one or more signal sources, and respective position relationships between the one or more signal sources and the first-type device.

In this third aspect of the present invention, furthermore an apparatus is disclosed, comprising at least one processor; and at least one memory including computer program code, the at least one memory and the computer program code configured to, with the at least one processor, cause the apparatus at least to receive, at a second-type device, a signal from a signal source of one or more signal sources to serve, together with at least a location of the second-type device, as an at least partial basis for determining a location estimate for the signal source, wherein an estimate of at least one of a location and an orientation of a first-type device is derivable at least based on respective location estimates for the one or more signal sources, and respective position relationships between the one or more signal sources and the first-type device.

For this third aspect of the present invention, the above description of the first and second aspects of the present invention and of their embodiments equally applies. In particular, all features and advantages of the first and second aspect of the present invention (including their embodiments) shall be understood to be disclosed in connection with the third aspect of the present invention as well. In particular, at least one of the position relationships may for instance be known a priori (for instance if the related signal source is comprised in the first-type device) or may be estimated at least based on a signal from the related signal source received at the first-type device.

According to an embodiment of the third aspect of the present invention, information related to the signal received at the second-type device is communicated from the second-type device to one of a service, the first-type device and another second-type device, wherein the one of the service, the first-type device and the other second-type device is configured to estimate the at least one of the location and the orientation of the first-type device based on the information related to the signal received at the second-type device and the respective position relationships between the one or more signal sources and the first-type device. The information related to the signal received at the second-type device may for instance be the received signal itself, or a sum signal that contains this received signal and furthermore respective signals from further signal sources received at the second-type device, or a parameterization of the received signal, or a parameterization of some or all signals contained in the sum signal, to name but a few non-limiting examples. The service may for instance be executed by an apparatus, such as for instance a server.

Furthermore, by the second-type device, the location (and optionally the orientation) of the second-type device may be obtained, and location (and optionally the orientation) may be communicated to the one of the service and the first-type device. Alternatively, the location of the second-type device may for instance be determined by the service.

In a fourth aspect of the present invention, a system is disclosed, the system comprising a first-type device, one or more second-type devices, and a processor comprised in one of the first-type device, one of the one or more second-type devices and a third-type device, the processor configured at least to estimate at least one of a location and an orientation of the first-type device at least based on respective location estimates for one or more signal sources, wherein at least one location estimate for a signal source of the one or more signal sources is determined at least based on respective signals from the signal source received at the one or more second-type devices and respective locations of the one or more second-type devices, and respective position relationships between the one or more signal sources and the first-type device.

For this fourth aspect of the present invention, the above description of the first, second and third aspect of the present invention and of their embodiments equally applies. In particular, all features and advantages of the first, second and third aspect of the present invention (including their embodiments) shall be understood to be disclosed in connection with the fourth aspect of the present invention as well. In particular, at least one of the position relationships may for instance be known a priori (for instance if the related signal source is comprised in the first-type device) or may be estimated at least based on a signal from the related signal source received at the first-type device.

The third-type device may for instance be a device that executes a service, such as for instance a server.

It is to be noted that the above-described embodiments of the present invention are to be understood as non-limiting examples only.

Furthermore, the embodiments described above and in particular their single features shall be understood to be disclosed in all possible combinations with each other.

These and further concepts of the invention will be apparent from and elucidated with reference to the detailed description presented hereinafter.

DETAILED DESCRIPTION OF EMBODIMENTS
OF THE INVENTION

The present invention pertains to collaborative estimation of a location and/or orientation of a first-type device (which is not capable of accurately determining its position by itself) using support from at least a second-type device (which is capable of accurately determining its position by itself).

In embodiments of the present invention, both the first-type device and the at least one second-type device receive signals from one or more signal sources. These received signals are analyzed to determine position relationships between the signal sources and the devices. Additional knowledge on the location of the second-type device then allows estimating the location and/or orientation of the first-type device.

In other embodiments of the present invention, the first-type device comprises at least one signal source, so that the position relationship between this signal source and the first-type device is known a priori. A signal from this signal source is then received by the at least one second-type device and used to determine a location estimate for this signal source, which, with the a priori known position relationship between the first-type device and this signal source, yields a location estimate for the first-type device. If further signal sources are present, which are not comprised in the first-type device (e.g. human beings acting as natural audio signal sources), signals from these further signal sources may be received and analysed by both the first-type device (to estimate position relationships between the first-type device and these signal sources) and the second-type device (to determine location estimates for these signal sources) as a further basis for the estimation of the location and/or orientation of the first-type device.

This concept will now be further elucidated with reference to FIGS. 1*a*-8*d*. FIGS. 9-20 are dedicated to a specific application field of the present invention, where sound sources that are received by microphones serve as signal sources. The description of all FIGS. 1-19 is explicitly understood to be supported and supplemented by the above description in the SUMMARY section of this specification.

Figure 1A:
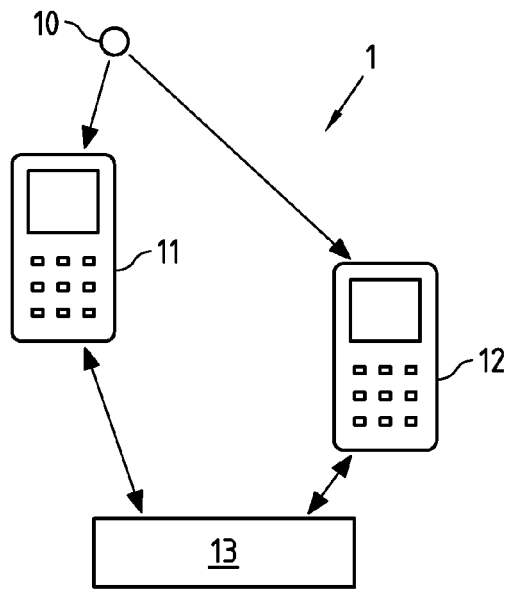
FIG. 1a: A schematic illustration of a system for location and/or orientation estimation according to an embodiment of the present invention.

FIG. 1*a* is a schematic illustration of a system 1 for location and/or orientation estimation according to an embodiment of the present invention. System 1 comprises a signal source 10, a first-type device 11, a second-type device 12 and a server (or in more general terms, a third-type device) 13.

In the system 1 of FIG. 1*a*, it is assumed that the location and/or orientation of first-type device 11 is estimated by server 13 based on information received from first-type device 11 and second-type device 12. This information pertains to signals from signal source 10 that are received at first-type device 11 and second-type device 12, and information on the location of second-type device 12. The server may for instance execute a dedicated service linked to a multi-view audiovisual media capture application or service provision or linked to multi-user event casting.

Figure 1B:
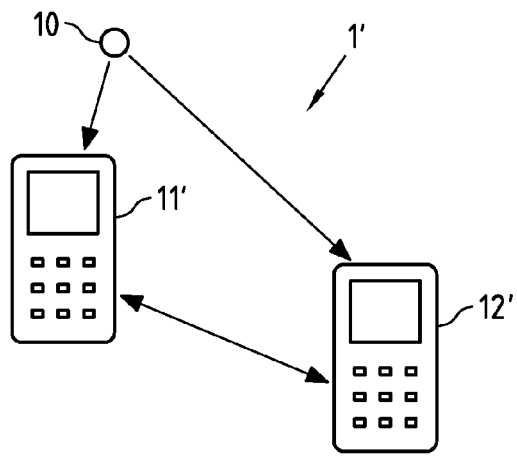
FIG. 1b: a schematic illustration a system for location and/or orientation estimation according to a further embodiment of the present invention.

FIG. 1*b* schematically illustrates an alternative system 1' with a signal source 10 and a modified first-type device 11' and a modified second-type device 12'. In the system 1', the location and/or orientation of first-type device 11' may be estimated by first-type device 11', or by second-type device 12', there is no server for this task any more. If first-type device 11' performs the estimation, it may for instance receive information on a signal received from signal source 10 at second-type device 12', and on a location of second-type device 12' determined by second-type device 12', and process this information together with the information on a signal from signal source 10 received at first-type device 11' itself. If second-type device 12' performs the estimation, it may for instance receive information on a signal received from signal source 10 at first-type device 11', and process this information together with the information on a signal from signal source 10 received at second-type device 12' and on a location of second-type device 12' determined by second-type device 12' itself.

In FIGS. 1*a* and 1*b*, for the sake of simplicity of presentation, only a single signal source and a single second-type device are depicted. It is however to be understood that the present invention is equally well intended for use of several signal sources and/or several second-type devices. The case of several signal sources is for instance discussed with reference to FIGS. 13-16 below.

Figure 1C:
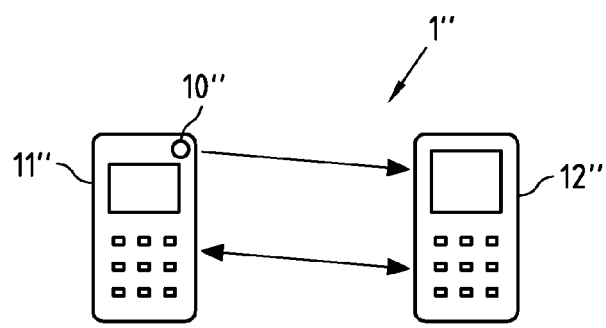
FIG. 1c: a schematic illustration a system for location and/or orientation estimation according to a further embodiment of the present invention.

FIG. 1*c* schematically illustrates a further alternative system 1" where a signal source 10" is comprised in modified first-type device 11". In the system 1", the location and/or orientation of first-type device 11" may be estimated by first-type device 11", or by second-type device 12". Signal source 10" may for instance emit a signal that is received by second-type device 12". This received signal or information thereon may then be used to determine, together with a determined location and/or orientation of the second-type device 12" or on information thereon, a location estimate for signal source 10". Since signal source 10" is comprised in first-type device 11", the position relationship between the first-type device 11" and the signal source 10" is known a priori (their locations may then for instance be known to be equal), and the location estimate for the signal source 10" thus may be considered as a location estimate for the first-type device 11".

If the location and/or orientation of the first-type device 11" is estimated by the second-type device 12", it may be necessary to provide the second-type device 12" with information on the a priori known position relationship between the first-type device 11" and the signal source 10", since this knowledge may not be present at the second-type device 12". This may for instance be achieved by including specific information into the signal emitted by signal source 10", for instance an information sequence that is known to the second-type device 12". The second-type device 12", when identifying this information sequence, may then be aware that the signal source from which this information sequence stems is comprised in the first-type device 11" (while other signal sources form which signals without such an information sequence are received may then be considered to be not comprised in first-type device 11"). However, for instance in scenarios where the signal source 10" comprised in the first-type device 11" is the only signal source, it may implicitly be known or assumed by the second-type device 12" that signal source 10" is comprised in first-type device 11'.

If the location and/or orientation of the first-type device 11" is determined by the first-type device 11", it may be necessary that the first-type device 11" receives information on the location estimate for signal source 10" determined by the second-type device 12" or information based on which first-type device 11" can determine such a location estimate for signal source 10". For instance, the signal received from signal source 10" at the second-type device 12" may be provided at least in parts to the first-type device 11". Since the signal emitted by the signal source 10" is known to the first-type device 11", the first-type device 11" may associate the signal received at the second-type device 12" and provided to the first-type device 11" with signal source 10", for instance by correlation. The first-type device 11" is then aware that the location estimate for signal source 10" also represents a location estimate for the first-type device 11".

In FIG. 1c, it was assumed that only one signal source 10" is present, and that this signal source is comprised in first-type device 11". It may of course also be the case that signals from further signal sources, which may be internal and/or external to first-type device 11", are received by the second-type device 12" (and also, in case of external signal sources, by the first-type device 11") and used as a further basis for estimating the location and/or orientation of the first-type device 11" as for instance explained with reference to FIG. 1b above.

Figure 2:
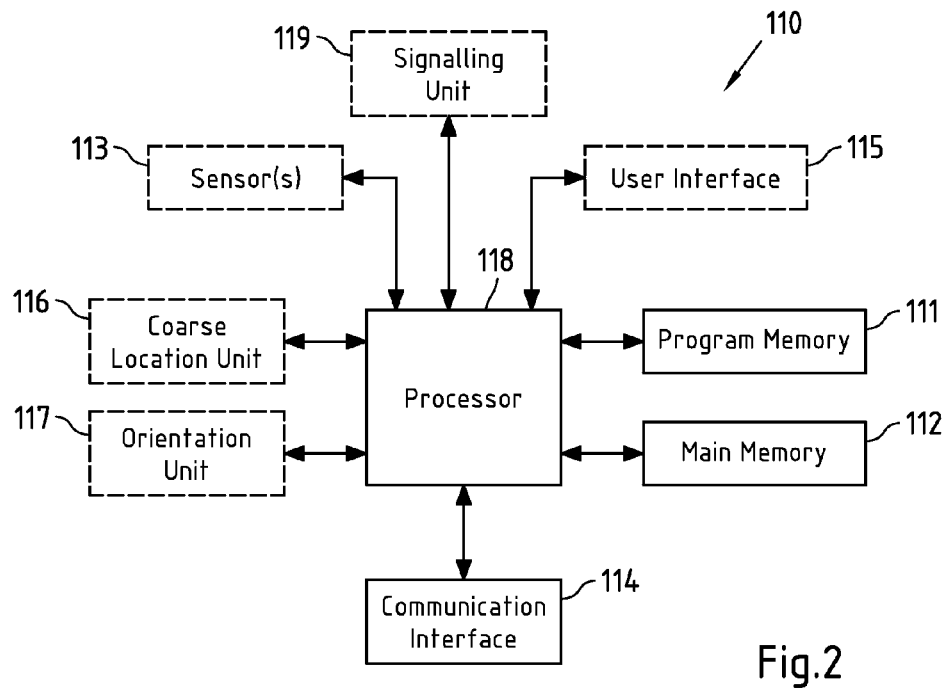
FIG. 2: a schematic illustration of an apparatus comprised in a first-type device of a system for location and/or orientation estimation according to an embodiment of the present invention.

FIG. 2 is a schematic illustration of an apparatus 110 comprised in a first-type device of a system for location and/or orientation estimation according to an embodiment of the present invention. This apparatus 110 may be comprised in first-type device 11 in system 1 of FIG. 1a, or may be comprised in the modified first-type device 11' of system 1' of FIG. 1b, as will be described in further detail below.

Apparatus 110 comprises a processor 118 that executes program code stored in program memory 111. Main memory 112 is used by processor 118 for instance as working memory. Processor 118 further interacts with one or more optional sensors 113 (for instance microphones or antennas) that are configured to receive signals from one or more signal sources. Such sensors 113 may for instance not be required in embodiments of the present invention where estimation of the location and/or orientation of the first-type device is based on a single signal source that is comprised in the first-type device (see FIG. 1c). Processor 118 further interacts with an optional user interface 115 that allows interaction between a user and first-type device 11/11'/11". Further optional components processor 118 interacts with are a coarse location unit 116 that allows coarsely locating first-type device 11/11'/11" and an orientation unit 117, that allows determining an orientation of first-type device 11/11'/11". This orientation unit 117 may for instance be embodied as a digital compass. Finally, processor 118 interacts with a communication interface 114, that allows communicating with other devices, for instance with server 13 of system 1 of FIG. 1a, or with modified second-type device 12' of system 1' of FIG. 1b, or with modified second-type device 12" of system 1" of FIG. 1c.

The coarse location unit 116 of apparatus 110 is understood to allow only a comparably rough positioning of the first-type device 11/11'/11" as compared to the positioning that is used by the second-type device 12/12'/12" (see the according description below). An example constellation could for instance be no positioning or only a cell-ID based positioning (without triangulation) being implemented by the first-type device 11/11'/11" and a GNSS-based positioning being implemented by the second-type device 12/12'/12".

Processor 118 further interacts with an optional signalling unit 119, which is configured to act as a signal source (e.g. as signal source 10" of System 1" FIG. 1c), i.e. to emit a signal. If the signal source is a sound source, the signalling unit 119 may for instance be embodied as a loudspeaker that emits an audio signal, for instance when triggered by processor 118. The presence of a signalling unit 119 in apparatus 110 may allow dispensing with external signal sources (i.e. signal sources that are not comprised in a first-type device such as first-type device 11" of system 1" of FIG. 1c).

Figure 3:
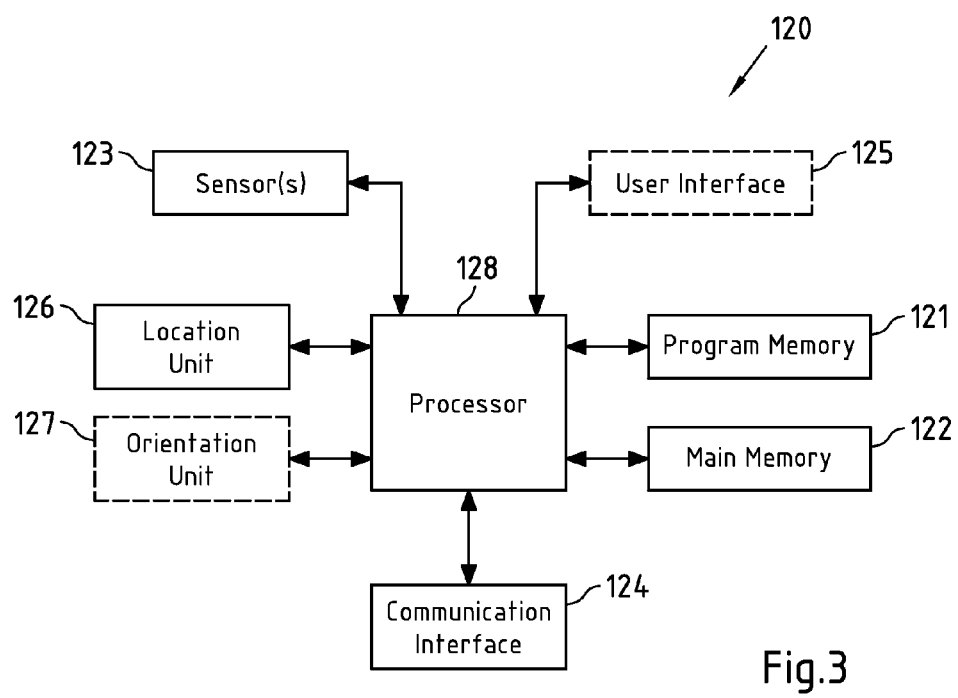
FIG. 3: a schematic illustration of an apparatus comprised in a second-type device of a system for location and/or orientation estimation according to an embodiment of the present invention.

FIG. 3 is a schematic illustration of an apparatus 120 comprised in a second-type device of a system for location and/or orientation estimation according to an embodiment of the present invention. This apparatus 120 may be comprised in second-type device 12 in system 1 of FIG. 1a, or may be comprised in the modified second-type device 12' of system 1' of FIG. 1b, or may be comprised in the modified second-type device 12" of system 1" of FIG. 1c, as will be described in further detail below.

Apparatus 120 comprises a processor 128 that executes program code stored in program memory 121. Main memory 122 is used by processor 128 for instance as working memory. Processor 128 further interacts with one or more sensors 123 (for instance microphones or antennas) that are configured to receive signals from one or more signal sources. Processor 128 further interacts with an optional user interface 125 that allows interaction between a user and second-type device 12/12'/12". Further components processor 128 interacts with are location unit 116, which allows locating second-type device 12/12'/12", and an optional orientation unit 127, that allows determining an orientation of second-type device 12/12'/12". This orientation unit 127 may for instance be embodied as a digital compass or use tracking methods (such as for instance head tracking) to determine an orientation of the second-type device 12/12'/12". Finally, processor 128 interacts with a communication interface 124, that allows communicating with other devices, for instance with server 13 of system 1 of FIG. 1a, or with modified first-type device 11' of system 1' of FIG. 1b or with modified first-type device 11" of system 1" of FIG. 1c.

Location unit 126 may implement one or more positioning techniques for positioning second-type device 12/12'/12". A location of a device can for instance be estimated using dedicated sensory information by monitoring, e.g. by using a GNSS-based positioning system like GPS. When a device is connected to a cellular network, the cell ID may provide a basic location information (wherein the granularity of positioning is determined by the cell size) that may be enhanced by further techniques. Knowledge of the cell ID in a cellular network corresponds to knowledge of an ID of the present Wireless Local Area Network (WLAN) access point, wherein the coverage area of a WLAN access point may generally be smaller than a cell of a cellular network. Also the signal strength and/or signal-to-noise ratio of a signal received from a base station may be used to estimate the distance of a device from a base station or access point. Furthermore, using the transmission signal from three or more base stations or access points and their corresponding ID, a device may determine the location using triangulation measurements.

Such triangular methods could also be applied relative to known landmarks. The location could then be estimated by detecting the objects from a camera image using additional compass information. Alternatively, the known landmarks may for instance emit a beacon signal (e.g. an audio signal, a visual signal or an audiovisual signal). For example, in marine navigation, the visual signal may have different colours or signal codes toward different directions. The Direction of Arrival (DoA) of the emitted audio signal of the known beacon, on the other hand, could be determined using microphone array methods.

Figure 4:
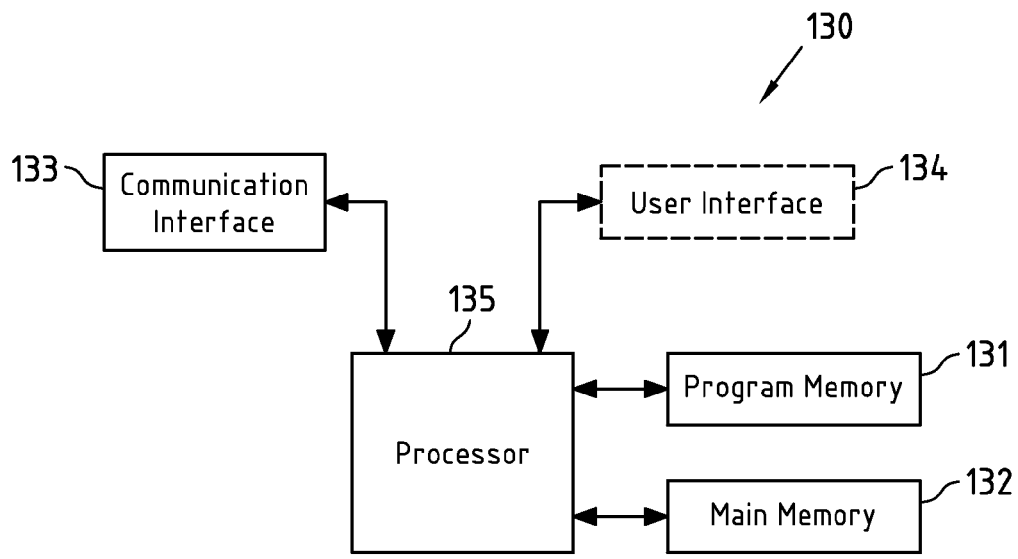
FIG. 4: a schematic illustration of an apparatus comprised in a server of a system for location and/or orientation estimation according to an embodiment of the present invention.

FIG. 4 is a schematic illustration of an apparatus 130 comprised in a server of a system for location and/or orientation estimation according to an embodiment of the present invention. This apparatus 130 may be comprised in server 13 in system 1 of FIG. 1a.

Apparatus 130 comprises a processor 135 that executes program code stored in program memory 131. Main memory 132 is used by processor 135 for instance as working memory. Processor 135 interacts with an optional user interface 134 that allows interaction between a user and server 13. Finally, processor 135 interacts with a communication interface 133 that allows communicating with other devices, for instance with first-type device 11 and second-type device 12 of system 1 of FIG. 1*a*.

The circuitry formed by the components of apparatuses 110, 120 and 130 may be implemented in hardware alone, partially in hardware and in software, or in software only, as further described at the end of this specification.

Figure 5:
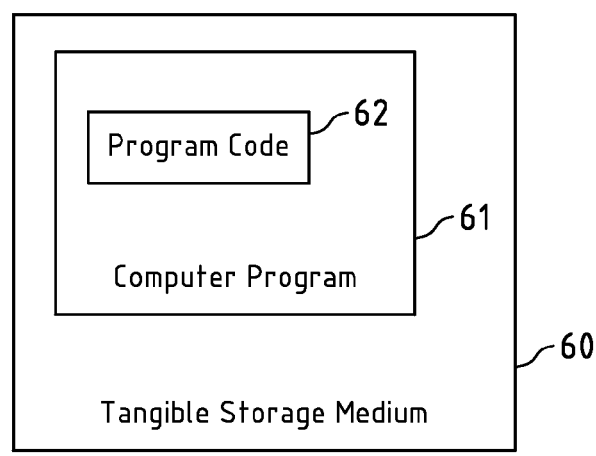
FIG. 5: a schematic illustration of a tangible storage medium according to an embodiment of the present invention.

FIG. 5 is a schematic illustration of a tangible storage medium 60 according to an embodiment of the present invention. This tangible storage medium may for instance form at least a part of program memory 111 of the apparatus 110 of FIG. 2, or of program memory 121 of apparatus 120 of FIG. 3 or of program memory 131 of apparatus 130 of FIG. 4. It may for instance be embodied as RAM or ROM memory, but equally well as a removable memory. Tangible storage medium 60 comprises a computer program 61, which in turn comprises program code 62. This program code may for instance implement the methods of flowchart 200 of FIG. 6, of flowchart 300 of FIG. 7, of flowchart 400 of FIG. 8*a*, of flowchart 900 of FIG. 8*b*, of flowchart 1000 of FIG. 8*c*, or of flowchart 1100 of FIG. 8*d*, which will be discussed below.

Reconsider the system 1 of FIG. 1*a*, where estimation of the location and/or orientation of the first-type device 11 is performed by server 13. The method steps performed by the first-type device 11, the second-type device 12 and the server 13 in this set-up are illustrated by the flowcharts 200, 300 and 400 of FIGS. 6, 7 and 8*a*, respectively.

Flowchart 200 (see FIG. 6) illustrates the processing at first-type device 11 (see FIG. 1*a*).

Flowchart 200 starts with an optional step 201, in which a coarse location and/or an orientation of the first-type device are obtained (by coarse location unit 116 and orientation unit 117 of apparatus 110 of FIG. 2).

In a step 202, signals from one or more signal sources are received at the first-type device (via sensor(s) 113 of apparatus 110 of FIG. 2).

In an optional step 203, the received signal (s) are processed (by processor 118 of apparatus 110 of FIG. 2). This processing may for instance comprise separating signals received from different signal sources. This processing may furthermore comprise analyzing the received signals, for instance to derive parameters such as directions between the first-type device and the respective signal source from which the signal was received, or the distance between the first-type device and the respective signal source from which the signal was received, to name but a few non-limiting examples. Instead of these parameters, different parameters that nevertheless allow derivation of the direction and/or distance may be derived.

In a step 204, information related to the signal(s) received at the first-type device is communicated to server 13 (via communication interface 114 of apparatus 110 of FIG. 2). This information may for instance be at least partially scrambled for privacy/security reasons. This information may for instance comprise the received signals or parts thereof themselves, for instance as a sequence of sampled and quantized values, or parameters derived from some or all of the received signals, such as for instance directions and/or distances towards signal sources. If, in step 201, a coarse location and/or an orientation of the first-type device has been obtained, this information may also be communicated to server 13 in step 204. Furthermore, if derived parameters are communicated, it may be advantageous that these derived parameters are furnished with information that allows associating these parameters with the signal source(s) they pertain to and/or with the received signals from which they were derived.

Figure 7:
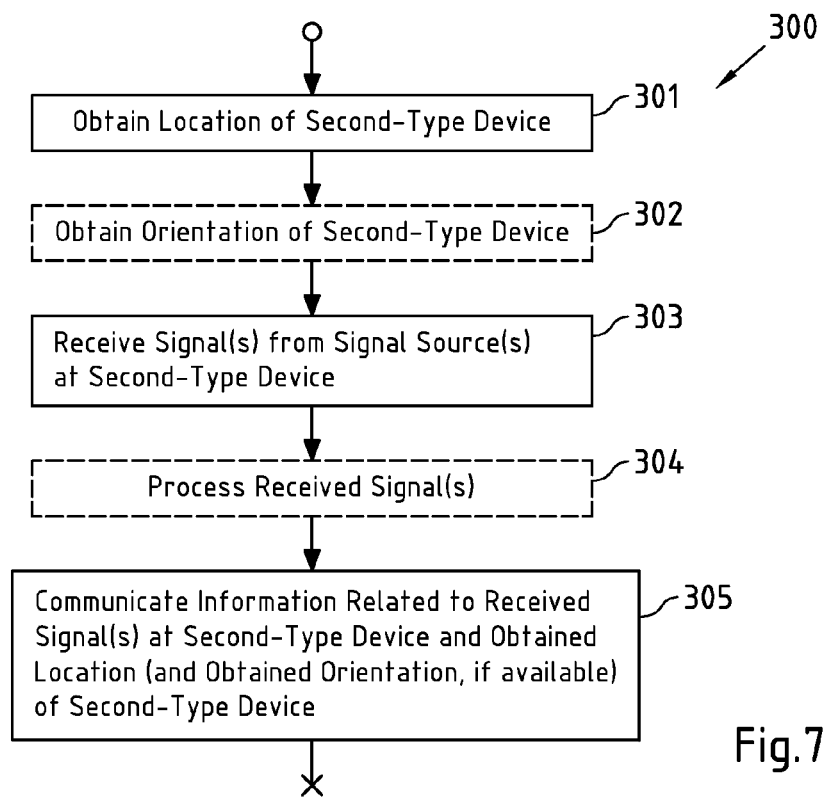
FIG. 7: a flowchart of a method performed by a second-type device of a system for location and/or orientation estimation according to an embodiment of the present invention.

Flowchart 300 of FIG. 7 illustrates the processing performed by the second-type device 12 (see FIG. 1*a*).

In a step 301, the location of the second-type device is obtained (by location unit 126 of apparatus 120 of FIG. 3).

In an optional step 302, the orientation of the second-type device is obtained (by orientation unit 127 of apparatus 120 of FIG. 3).

In a step 303, then signals from one or more signal sources are received at the second-type device (via sensor(s) 123 of apparatus 120 of FIG. 3).

In an optional step 304, the received signal (s) are processed (by processor 128 of apparatus 120 of FIG. 3). This processing may for instance comprise separating signals received from different signal sources. This processing may furthermore comprise analyzing the received signals, for instance to derive parameters such as directions between the second-type device and the respective signal source from which the signal was received, or the distance between the second-type device and the respective signal source from which the signal was received, to name but a few non-limiting examples. Instead of these parameters, different parameters that nevertheless allow derivation of the direction and/or distance may be derived. This processing may furthermore comprise determining location estimate for the signal sources (for instance based on the estimated directions and/or distances and the obtained location (and the optionally obtained orientation) of the second-type device).

In a step 305, information related to the signal(s) received at the second-type device and related to the obtained location of the second-type device is communicated to server 13 (via communication interface 124 of apparatus 120 of FIG. 3). This information may for instance be at least partially scrambled for privacy/security reasons. This information may for instance comprise the received signals or parts thereof themselves, for instance as a sequence of sampled and quantized values, or parameters derived from some or all of the received signals, such as for instance directions and/or distances towards signal sources, and the obtained location (and the optionally obtained orientation) of the second-type device. Equally well, this information may comprise (or consist of) location estimates for signal sources determined by the second-type device. Furthermore, if derived parameters are communicated, it may be advantageous that these derived parameters are furnished with information that allows associating these parameters with the signal source(s) they pertain to and/or with the received signals from which they were derived.

Figure 8A:
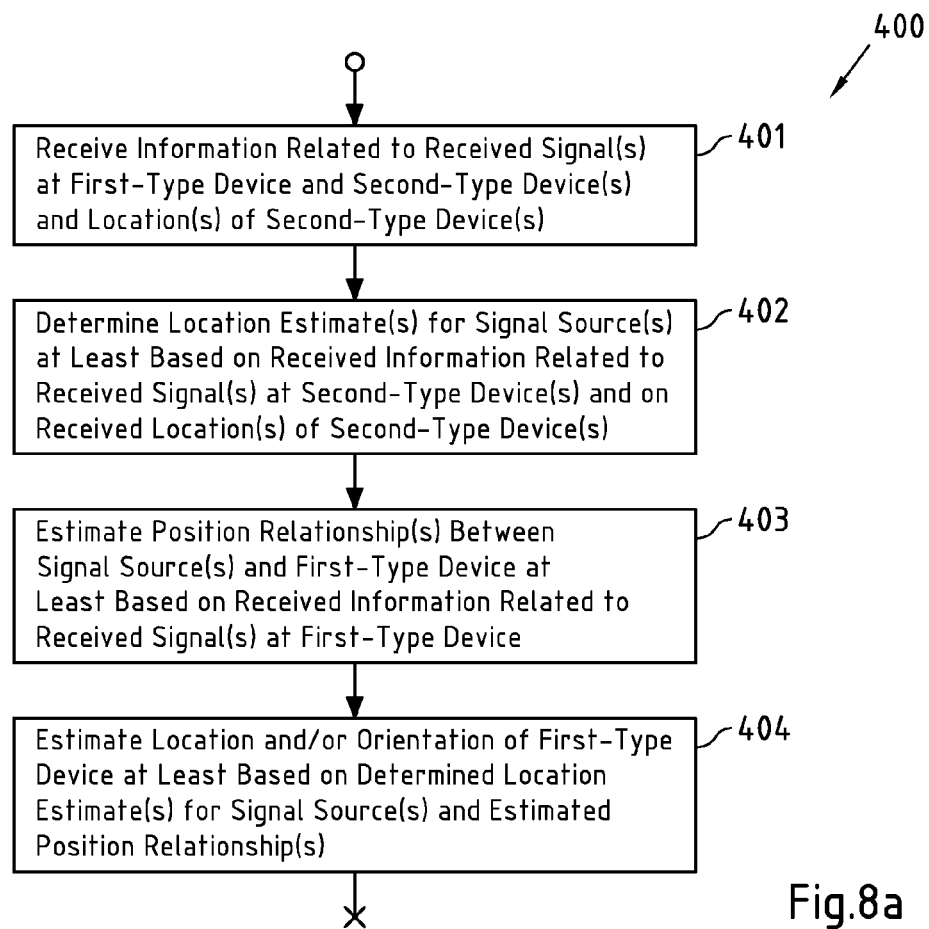
FIG. 8a: a flowchart of a method performed by a server of a system for location and/or orientation estimation according to an embodiment of the present invention.

Flowchart 400 in FIG. 8*a* illustrates the processing performed by the server 13 (see FIG. 1*a*).

In step 401, information related to the signal(s) received at the first-type device 11 and the second-type device(s) 12 (in case that there are more than one second-type device) and the location(s) of the second-type device(s) 12 are obtained (via communication interface 133 of apparatus 130 of FIG. 4). If a coarse location and/or orientation of the first-type device 11 have been communicated by the first-type device 11, this information would also be received in step 401, as well as optionally obtained orientation(s) of the second-type device(s) 12.

In a step 402, the location estimate(s) for the signal source(s) are determined at least based on the received information related to the received signal(s) at the second-type device(s) and on the received location(s) (and, if available, the received orientation(s)) of the second-type device(s). If this information has been scrambled before communication, it is accordingly descrambled. If the information related to the received signal(s) at the second-type device(s) comprises the received signal(s) in basically unprocessed form, this determining may comprise separating, with respect to each second-type device, the received signal(s) stemming from different signal sources, and/or analyzing the received signal(s) to derive parameters such as the direction(s) and/or the distance(s) between the signal source (s) and the second-type device(s). This analysis may for instance yield position relationships, each between a signal source and a second-type device, and together with the location of this second-type device (and its orientation, if available), a location estimate for the signal source may then be determined. The location estimates for the same signal source derived based on signals received at different second-type devices may be combined to obtain a more accurate location estimate for this signal source. Therein, location estimates pertaining to the same signal source may be grouped to allow this combination, the grouping being based on an analysis (e.g. by cross-correlation) of the received signals based on which these location estimates were determined. Further information such as previous location estimates for signal sources and level differences of signals of different signal sources received at the same second-type device may be considered in the determining of the location estimates as well.

In a step 403, position relationship(s) between the signal source(s) and the first-type device are estimated at least based on the received information related to received signal(s) at the first-type device (and the orientation of the first-type device, if available). Similarly, if the information related to the received signal(s) at the first-type device(s) comprises the received signal(s) in basically unprocessed form, this determining may comprise separating the received signal(s) stemming from different signal sources, and/or analyzing the received signal(s) to derive parameters such as the direction(s) and/or the distance(s) between the signal source(s) and the first-type device.

In a step 404, the location and/or orientation of the first-type device is estimated at least based on the determined location estimate(s) for the signal source(s) of step 402 and on the estimated position relationship (s) of step 403. Therein, those of the determined location estimate(s) and the estimated position relationship(s) that pertain to the same signal sources are considered for setting up signal-source-specific constraints for the location and/or orientation of the first-type device, and these signal-source-specific constraints are merged to obtain an estimate of the location and/or orientation of the first-type device. Therein, the determined location estimate(s) and the estimated position relationship(s) that pertain to the same signal sources may for instance be identified based on analysis (e.g. cross-correlation) of the respective received signals based on which the location estimate(s) and the position relationship estimate(s) have been determined.

In this estimation, further information may be used, such as for instance a coarse location of the first-type device if available, a previous estimate of the location and/or orientation of the first-type device, and level differences between signals of different signal sources received at the first-type device, to name but a few examples.

Returning now to system 1' of FIG. 1*b*, the case that the location and/or orientation of the first-type device 11' is estimated by first-type device 11' itself shall be considered. As already described above, the basic architecture of first-type device 11' then may remain the same as the architecture of first-type device 11 shown in FIG. 2. Only the tasks performed by processor 118 change, which can be accomplished by letting this processor 118 execute the steps of flowchart 900 of FIG. 8*b*. Both the architecture and the processing of the second-type device 12' remain the same as that of second-type device 12 (see FIG. 3 and FIG. 7), but it has to be kept in mind that second-type device 12' now communicates with first-type device 11' instead of server 13.

Figure 8B:
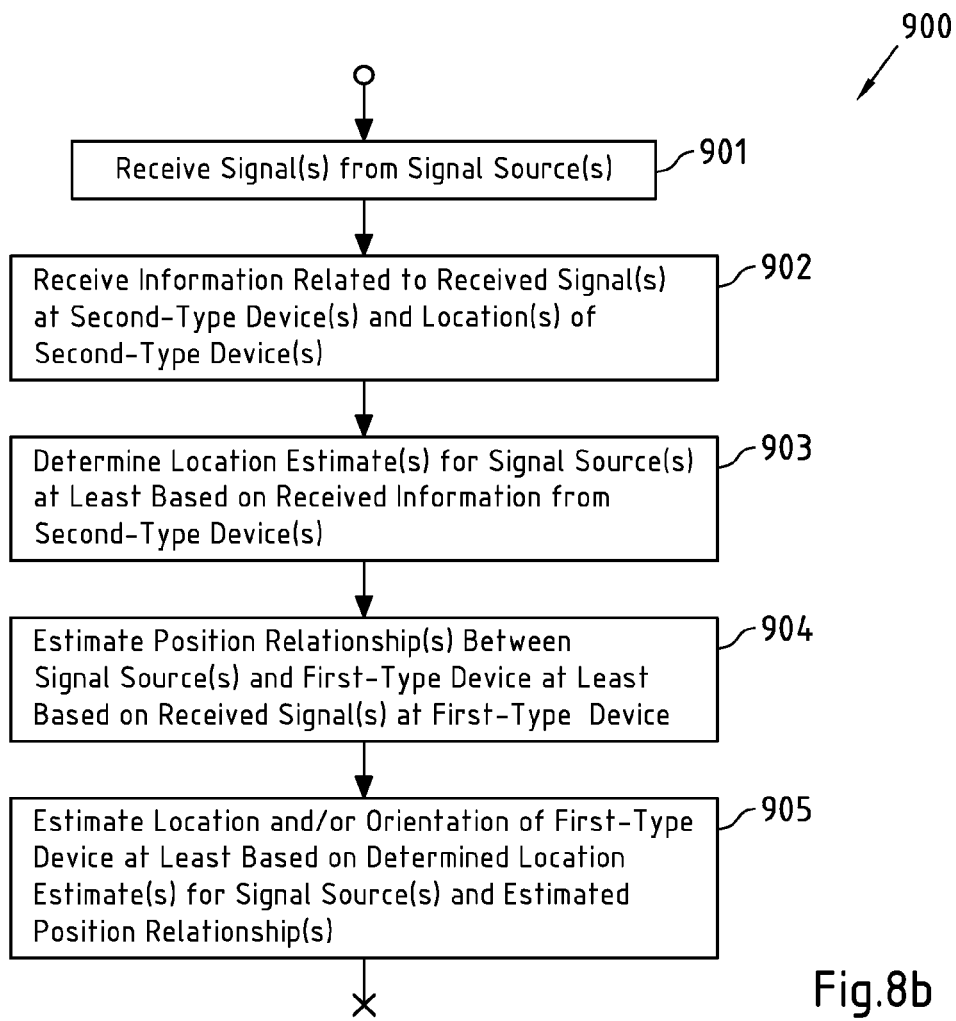
FIG. 8b: a flowchart of a method performed by a first-type device of a system for location and/or orientation estimation according to an embodiment of the present invention.

Flowchart 900 of FIG. 8*b* illustrates the processing of first-type device 11' in the system 1' of FIG. 1*b*, when the location and/or orientation of the first-type device is estimated by the first-type device 11'.

In a step 901, the signal(s) from the signal source(s) are received at the first-type device 11' (via sensors 113 of apparatus 110 of FIG. 2).

In a step 902, information related to the signal(s) received at the second-type device(s) 12' and the location(s) (and orientation (s) if available) of the second-type device (s) are received. This information is communicated by the second-type device(s) in step 305 of flowchart 300 of FIG. 6.

In a step 903, the location estimate(s) for the signal source(s) are determined at least based on the received information from the second-type device(s). This is accomplished as described with reference to step 402 of flowchart 400 of FIG. 8*a*.

In a step 904, the position relationship (s) between the signal source(s) and the first-type device are estimated at least based on the signals received at the first-type device in step 901. This is accomplished as described with reference to step 403 of flowchart 400 of FIG. 8*a*.

Finally, in a step 905, the location and/or orientation of the first-type device is estimated at least based on the determined location estimate(s) for the signal source(s) of step 903 and the estimated position relationship(s) of step 904, in a way as described with reference to step 404 of the flowchart 400 of FIG. 8*a*.

Once more returning to system 1' of FIG. 1*b*, the case that the location and/or orientation of the first-type device 11' is estimated by second-type device 12' shall now be considered. The basic architecture of second-type device 12' then may remain the same as the architecture of second-type device 12 shown in FIG. 3. Only the tasks performed by processor 128 change, which can be accomplished by letting this processor 128 execute the steps of flowchart 1000 of FIG. 8*c*. Both the architecture and the processing of the first-type device 11' remain the same as that of first-type 11 (see FIG. 2 and FIG. 6), but it has to be kept in mind that first-type device 11' now communicates with second-type device 12' instead of server 13.

Figure 8C:
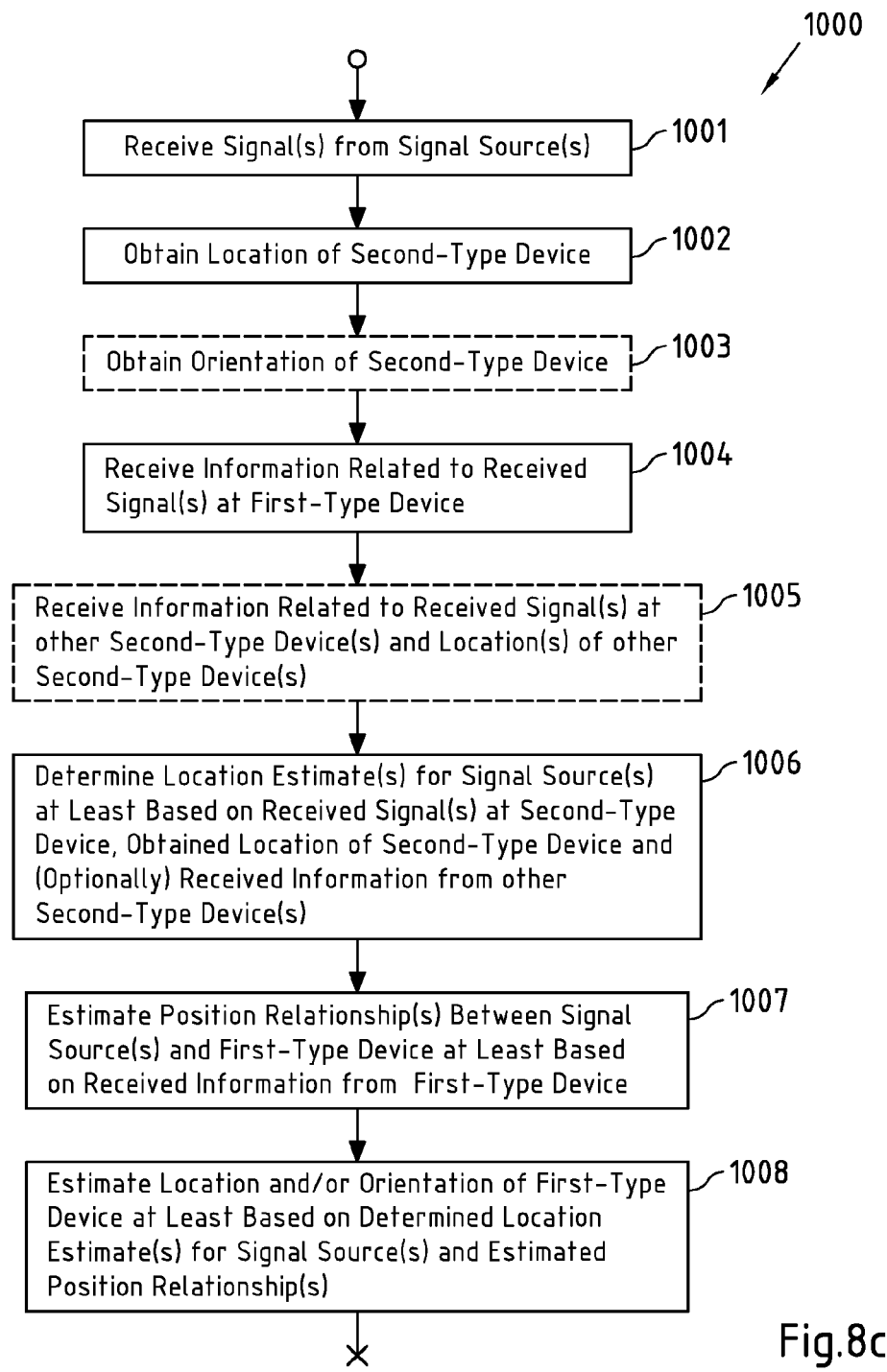
FIG. 8c: a flowchart of a method performed by a second-type device of a system for location and/or orientation estimation according to an embodiment of the present invention.

Flowchart 1000 of FIG. 8*c* illustrates the processing of second-type device 12' in the system 1' of FIG. 1*b*, when the location and/or orientation of the first-type device is estimated by the second-type device 12'.

In a step 1001, reception of the signal(s) from the signal source(s) takes place (via sensors 123 of apparatus 120 of FIG. 3). For instance, the second-type device may continuously (or at least continuously during limited time periods) record signals from signal sources.

In a step 1002, a location of the second-type device is obtained (by location unit 126 of apparatus 120 of FIG. 3).

In an optional step 1003, an orientation of the second-type device is obtained (by orientation unit 127 of apparatus 120 of FIG. 3).

In a step 1004, information related to the signal (s) received at the first-type device 11' is received (via communication interface 124 of apparatus 120 of FIG. 3). Such information is communicated by the first-type device in step 204 of flowchart 200 of FIG. 6. When receiving information related to the signals received at the first-type device, the second-type device may then for instance compare this information (for instance the signals received at the first-type device) with the signals received at the second-type device in step 1001 to identify signals that stem from the same signal source.

Step 1005 is an optional step in which information related to one or more signals received at one or more other second-type devices and the location(s) (and orientations if available) of the other second-type device(s) are received.

In step 1006, the location estimate(s) for the signal source(s) are determined at least based on the signal(s) at the second-type device in step 1004, the location (and the orientation if available from step 1003) of the second-type device obtained in step 1002 and the information from the other second-type device (s) optionally received in step 1005. The location estimate(s) are determined as described with reference to step 402 of flowchart 400 of FIG. 8a above.

In step 1007, the position relationship(s) between the signal source(s) and the first-type device are estimated at least based on the information received from the first-type device in step 1001. This is accomplished as described with reference to step 403 of flowchart 400 of FIG. 8a above.

Finally, in step 1008, the location and/or orientation of the first-type device is estimated at least based on the location estimate (s) for the signal source(s) determined in step 1006 and the position relationship (s) estimated in step 1007. This is accomplished as described with reference to step 404 of flowchart 400 of FIG. 8a above.

Returning now to system 1" of FIG. 1c, the case that the location and/or orientation of the first-type device 11" that comprises signal source 10" is estimated by first-type device 11" itself shall be considered. As already described above, the basic architecture of first-type device 11" then may remain the same as the architecture of first-type device 11 shown in FIG. 2. Only the tasks performed by processor 118 change, which can be accomplished by letting this processor 118 execute the steps of flowchart 1100 of FIG. 8d. Both the architecture and the processing of the second-type device 12" remain the same as that of second-type device 12 (see FIG. 3 and FIG. 7), but it has to be kept in mind that second-type device 12" now communicates with first-type device 11" instead of server 13.

Figure 8D:
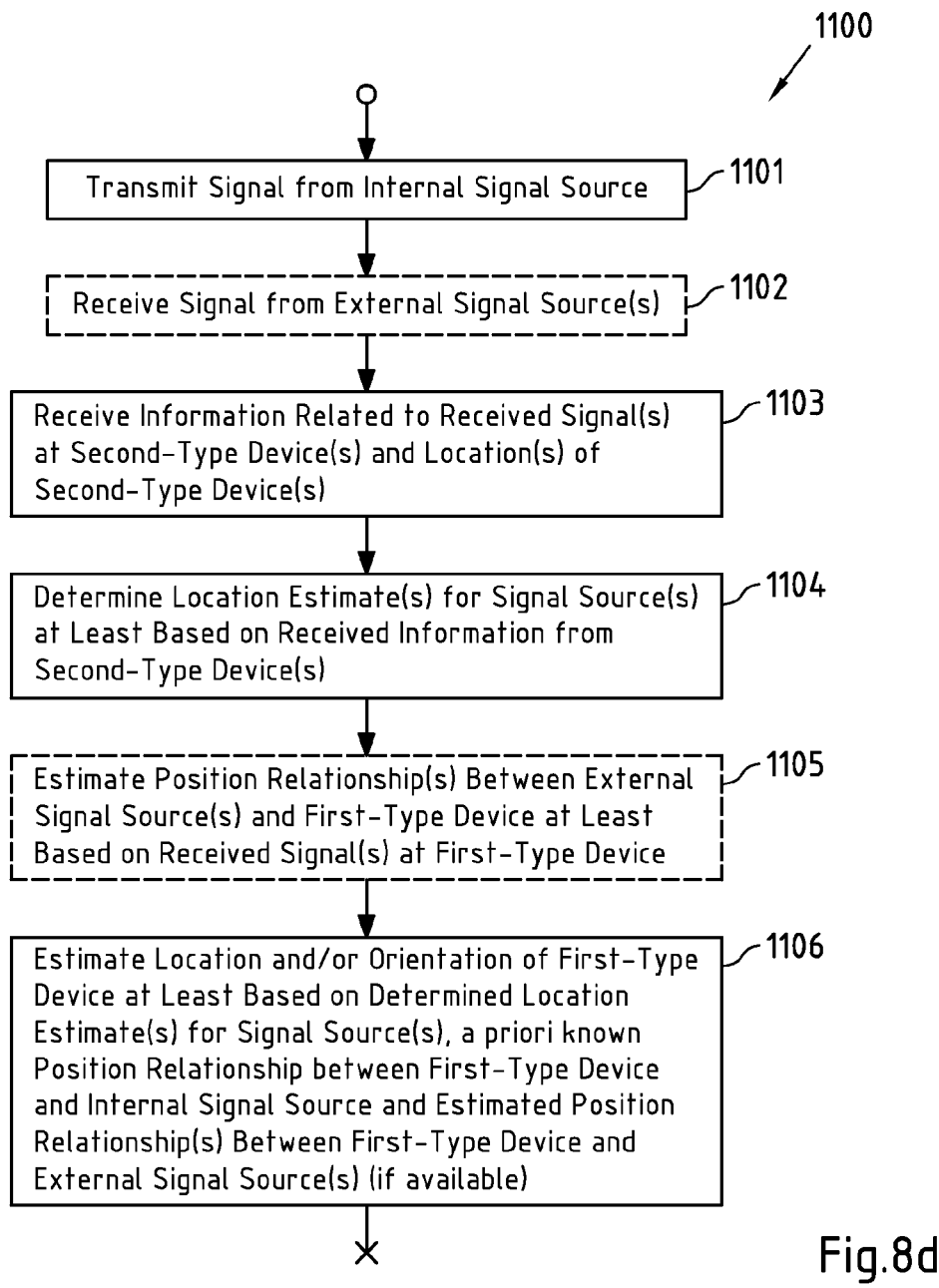
FIG. 8d: a flowchart of a method performed by a first-type device of a system for location and/or orientation estimation according to an embodiment of the present invention.

Flowchart 1100 of FIG. 8d illustrates the processing of first-type device 11" in the system 1" of FIG. 1c, when the location and/or orientation of the first-type device is estimated by the first-type device 11', which comprises the signal source 10".

In a step 1101, a signal is transmitted form a signal source that is internal (i.e. comprised in the first-type device), like signal source 10" of first-type device 11" in FIG. 1c.

In an optional step 1102, one or more respective signal(s) from one or more signal source(s) that are external with respect to (i.e. not comprised in) the first-type device 11" are received at the first-type device 11" (via sensors 113 of apparatus 110 of FIG. 2). Step 1102 may for instance only be performed if apparatus 110 of FIG. 2 is equipped with any sensors 113 at all).

In a step 1103, information related to the signal (s) received at the second-type device(s) 12" from the internal signal source and optionally from one or more external signal source(s) and the location(s) (and orientation(s) if available) of the second-type device(s) are received. This information is communicated by the second-type device(s) in step 305 of flowchart 300 of FIG. 6.

In a step 1104, the location estimate(s) for the internal signal source and the optional external signal source(s) are determined at least based on the received information from the second-type device(s). This is accomplished as described with reference to step 402 of flowchart 400 of FIG. 8a. As further information for the determination of the location estimate for the internal signal source, the power level used for the transmission of the signal in step 1101 may be exploited, for instance to determine the distance between the internal signal source and the second-type device(s) that received signals from the internal signal source.

In an optional step 1105, the position relationship(s) between the external signal source(s) and the first-type device are estimated at least based on the signals received at the first-type device in step 1102. This is accomplished as described with reference to step 403 of flowchart 400 of FIG. 8a.

Finally, in a step 1106, the location and/or orientation of the first-type device is estimated at least based on the determined location estimate(s) for the internal signal source and the optional external signal source(s) of step 1104, on the a priori known position relationship between the internal signal source and the first-type device and the estimated position relationship(s) between the optional external signal source(s) and the first-type device of step 1105, similarly as described with reference to step 404 of the flowchart 400 of FIG. 8a.

In the following, an even more detailed description of embodiments of the present invention will be given with reference to FIGS. 9-20.

Therein, it is—merely as a non-limiting example—assumed that the signal sources are audio sources that emit audio signals which are detectable at receiving devices via microphones. If more than one microphone is available at the receiving device, a Direction of Arrival (DoA) of the received signal can be determined, as will be described below. It is readily clear to a person skilled in the art that the principles of estimating the DoA of an audio signal based on an array of microphones also apply to a variety of other signal types, such as for instance electro-magnetic signals in case that an antenna array for reception is available.

The basic DoA estimation is conducted using a microphone array comprising at least two microphones. Typically, the output of the array is the sum signal of all microphones. Physically turning the array and detecting the direction that provides the highest amount of energy of the signal of interest is the most straightforward method to estimate the DoA.

Steering of the array, i.e. turning the array towards the point of interest is typically implemented, instead of physically turning the device, by exploiting the sound wave interference phenomena and adjusting the microphone delay lines. For example, the two-microphone array is aligned off the perpendicular axis of the microphones by delaying one of the two microphone signals with respect to the other by a certain amount before summing them up. The time delay providing the maximum energy of the sum signal of interest corresponds to the DoA.

Figure 9:
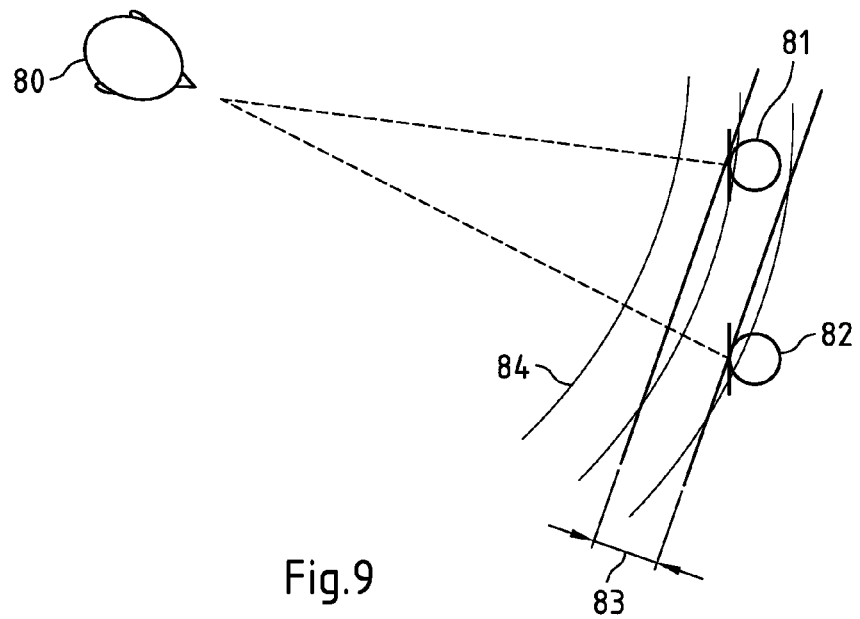
FIG. 9: a schematic illustration of a delay difference cause by signal reception with a microphone array.

FIG. 9 illustrates the situation when the microphone array comprising microphones 81 and 82 is physically turned slightly off the sound source 80 (i.e. the normal of the array does not point towards sound source 80). As can be seen from FIG. 9, the sound wave (illustrated by the circle segments 84 arrives slightly delayed to the microphone 82 as compared to microphone 81. Now, to steer the microphone array towards the actual sound source 80, the signal from microphone 81 needs to be delayed, with respect to the signal from microphone 82, by a time unit corresponding to the difference 83 in distance perpendicular to the sound source 80.

When the distance between the microphones 81 and 82, the required time delay and the speed of sound are known, the DoA of the sound source 80 with respect to the array normal may be determined using trigonometry.

Another relatively straightforward method to estimate the DoA is to detect the amplitude difference between signals captured by microphones 81 and 82 and to apply corresponding panning laws.

As already discussed above, signals received at the first-type device and/or at the second-type device may be parameterized, for instance to reduce the amount of bandwidth required to communicate information related to the received signals to the server 13 (in the system of FIG. 1a) or to either the first-type device 11' or second-type device 12' (in the system of FIG. 1b) or to the first-type device 11" (in the system of FIG. 1c).

In case of audio signals, an example of spatial audio parameterization and coding is the Binaural Cue Coding (BCC), which is based on spatial cues describing the audio source locations and diffuseness in time and space. Typically, the input signal (consisting of two or more audio channels or sources) for a BCC encoder is first transformed in time-frequency domain using for example a Fourier transform or a Quadrature Mirror Filter (QMF) filterbank decomposition. The audio scene is analysed in the transform domain, and the corresponding parameterization is determined and provided, e.g. transmitted, to a receiver or stored for later consumption or delivery.

Typically a BCC analysis comprises computation of Inter-channel Level Difference (ILD) and Inter-channel Time Difference (ITD) parameters estimated within one or more transform domain time-frequency slots, i.e. in one or more frequency subbands of one or more input frames. In addition, the Inter-Channel Coherence (ICC) between one or more channel pairs may be determined to estimate the diffuseness of sound sources.

Figure 10:
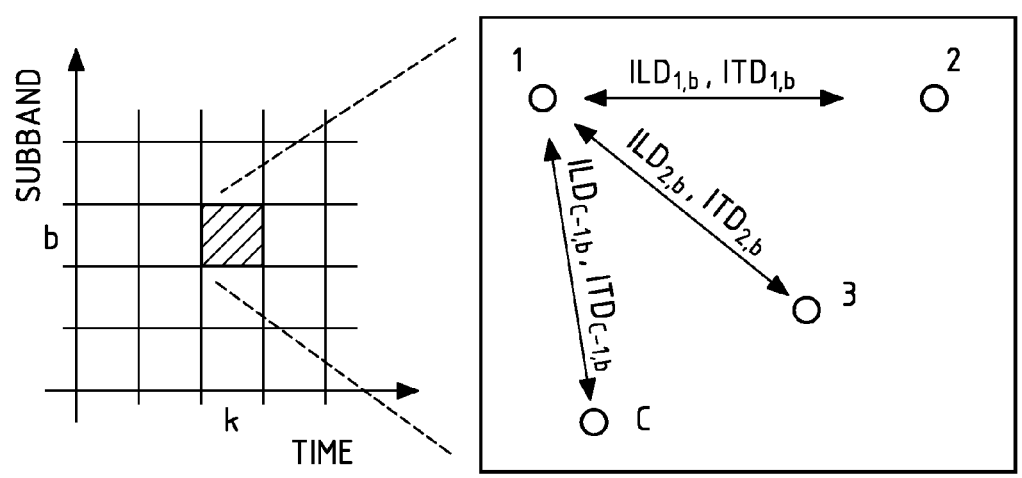
FIG. 10: a schematic illustration of the Inter channel Level Difference (ILD) and Inter channel Time Difference (ITD) parameters in binaural cue coding.

FIG. 10 shows an example of ILD and ITD estimation for a multi-channel audio content (with C audio sources). The ILD and ITD parameters may typically be determined for each channel pair. The ICC, on the other hand, may typically be determined individually for each channel. In case of a binaural audio signal consisting of two channels, the BCC cues may be determined for decomposed left and right channels.

In the following, some details of the BCC approach are illustrated using an example with two input channels and a single downmix signal. However, the representation can be generalized to cover input signal with more than two channels.

The ILD $\Delta L_n$ for each frequency subband n can be estimated in the logarithmic domain as:

$$\Delta L_n = 10\log_{10}\left(\frac{s_n^{L^T} s_n^L}{s_n^{R^T} s_n^R}\right) \tag{1}$$

where $S_n^L$ and $S_n^R$ are the time-domain left and right channel signals in frequency subband n, respectively.

The ITD $\tau_n$, i.e. the delay, or time difference, between the left and right channels for frequency subband n, can be determined as follows:

$$\tau_n = \arg\max_d\{\Phi_n(k,d)\} \tag{2}$$

where $\Phi_n(k,d)$ is the normalised correlation in frequency subband n:

$$\Phi_n(k,d) = \frac{s_n^L(k-d_1)s_n^R(k-d_2)}{\sqrt{(s_n^L(k-d_1)s_n^L(k-d_1))(s_n^R(k-d_2)s_n^R(k-d_2))}} \tag{3}$$

where $d_1 = \max\{0,-d\}$ $d_2 = \max\{0, d\} \tag{4}$

The normalised correlation of Equation (3) is actually the ICC parameter. It may typically be utilised for capturing the ambient components that are decorrelated with the "dry" sound components represented by magnitude (i.e. level) and phase (time) difference parameters of Equations (1) and (2).

Alternatively, BCC coefficients may be determined in the DFT domain. Using for example the windowed Short Time Fourier Transform (SIFT), the frequency subband signals above are converted to groups of transform coefficients. $S_n^L$ and $S_n^R$ are the spectral coefficient vectors of the left and right (binaural) signal for frequency subband n of the given analysis frame, respectively. The transform-domain ILD may be determined according to Equation (5):

$$\Delta L_n = 10\log_{10}\left(\frac{S_n^{L^*} S_n^L}{S_n^{R^*} S_n^R}\right), \tag{5}$$

where * denotes the complex conjugate.

However, the time difference (ITD) may be more convenient to handle as the Inter-Channel Phase Difference (ICPD) according to Equation (6):

$$\phi_n = \angle(S_n^{L^*} S_n^R) \tag{6}$$

The inter-channel coherence may be computed in the frequency domain using a computation quite similar to the one used in the time-domain calculation of Equation (3) using Equation (7):

$$\Phi_n = \frac{S_n^{L^*} S_n^R}{\sqrt{(S_n^{L^*} S_n^L)(S_n^{R^*} S_n^R)}} \tag{7}$$

An alternative BCC determination in the DFT domain (e.g. based on Equations (5) to (7)) may require less computation, when the time-domain ITD estimation using correlation estimation is replaced with ICPD phase estimation of DFT-domain spectral coefficients.

The level and time/phase difference cues represent the dry surround sound components, i.e. they can be considered to model the sound source locations in space.

Basically, ILD and ITD cues represent surround sound panning coefficients. The coherence cue, on the other hand, is supposed to cover the relation between coherent and decorrelated sounds. The level of late reverberation of the sound sources e.g. due to the room effect, and the ambient sound distributed between the input channels may have a significant contribution to the perceived spatial audio sensation. Therefore, a proper estimation and synthesis of IC cue is a matter of importance especially in coding and reconstruction of binaural signals.

The output of a multi-channel or binaural encoder may for instance comprise the interchannel level difference (ILD) representing stereo panning coefficients, the interchannel phase difference (ICPD) i.e the interchannel time difference (ITD), the interchannel correlation (ICC) and the downmix audio signal or signals.

Now, when the BCC parameterisation is available, the DoA estimation can be conducted for each frequency subband n by first converting the respective time difference cue $\tau_n$ into a reference DoA cue $\phi_n$ by solving the Equation (8):

$$\tau_n = (|x|\sin(\phi_n))/c, \quad (8)$$

where |x| is the distance between the microphones and c is the speed of sound.

Alternatively or additionally, the inter-channel level cue may be used as basis for determining the DoA cue $\phi_n$. The DoA cue $\phi_n$ may be determined using for example the panning Equation (9):

$$\sin\phi_n = \frac{l_1 - l_2}{l_1 + l_2}, \quad (9)$$

where $l_i = s_n^{iT} s_n^i$ of channel i, i.e. the energy of channel i in frequency subband n.

Figure 6:
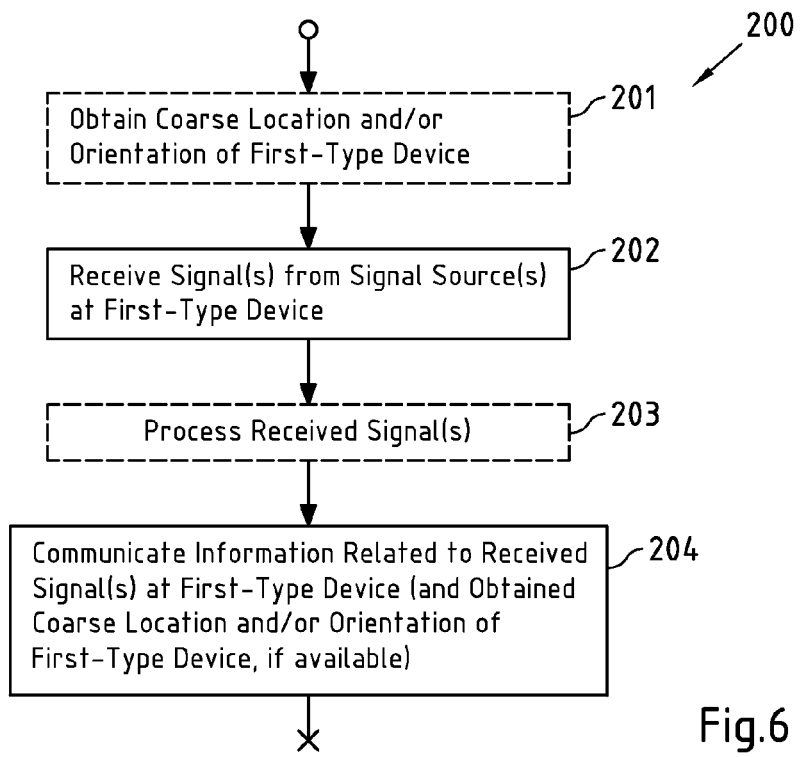
FIG. 6: a flowchart of a method performed by a first-type device of a system for location and/or orientation estimation according to an embodiment of the present invention.

Consequently, step 203 of flowchart 200 of FIG. 6 or step 304 of flowchart 300 of FIG. 7 could analyze the receive signal (s) to derive one or more of the above-described cues, and then this cues could be communicated to allow a receiver to derive a DoA from these one or more cues.

In the following, an embodiment of the present invention will be considered that uses audio sources as signal sources and provides a method to collaboratively estimate the accurate location and/or orientation of a (fixed or mobile) first-type device in a multi-device system. This approach may for instance be used in a multi-view application.

In this embodiment, a (fixed or mobile) second-type device equipped with accurate location and direction estimation, such as GPS, knowledge of cell ID, WLAN access points and compass, sends location and orientation information and at least a segment of a captured audio signal (i.e. at least a segment of an audio signal received from one or more audio sources with a multi-microphone (array) system) to a location service, which may for instance be a dedicated service linked to a multi-view audiovisual media capture application or service provision or linked to multi-user event casting. Alternatively, the second-type device may analyse the segment of the captured audio signal and provide the spatial audio cues and context information to the location service. In both cases, the intention is allow extraction of the directions or locations of individual audio source in the captured audio scene. In addition, when the segment of the captured audio signal is provided to the location service, the segment of the captured audio signal may be scrambled in such a manner that it cannot be reconstructed in human understandable form for privacy preservation, but that the audio scene context can still be reconstructed.

In this embodiment, a first-type device not equipped with accurate location and/or orientation estimation capability may perform rough location estimation using the cell ID or WLAN AP knowledge. Alternatively, no location info may be available to this first-type device at all. To enable location and/or orientation estimation, the first-type device sends at least a segment of an audio signal of short duration to the location service. The recorded audio content comprises two or more channels to enable accurate spatial audio scene analysis. Alternatively, the first-type device may send determined spatial audio scene cues and context. The first-type device may also already provide the estimated audio source locations and spatial audio cues for further analysis in the server. The location service then estimates the location and/or orientation of the first-type device based on the data feeds of the first-type device and the second-type device(s) comparing the sensory information (cell ID, WLAN AP knowledge etc.) and spatial audio cues.

In this embodiment, alternatively a service application in the second-type device may parameterize the audio scene and send it to the first-type device without using any centralised server or service. The first-type device may then perform the cell-ID- and/or WLAN-AP-based localization assisted with the audio-based localisation. Alternatively, the second-type device may be a fixed system specifically designed to analyse the audiovisual content within a certain location. In this case the explicit location and orientation of the second-type device may be known a priori.

This collaborative estimation of the location and/or orientation of the first-type device is improved when more information about the audiovisual image is gained. Additional sensory information, such as orientation, may improve the accuracy significantly.

Setting out from this embodiment of the present invention, examples for the estimation of the location and/or orientation of the first-type device based on an according analysis of signals received from one or more audio sources at the first-type device and at a second-type device will now be considered. Therein, it should be noted that these examples equally well apply to scenarios where other types of signal sources, such as for instance electromagnetic signal sources, are used.

Figure 11:
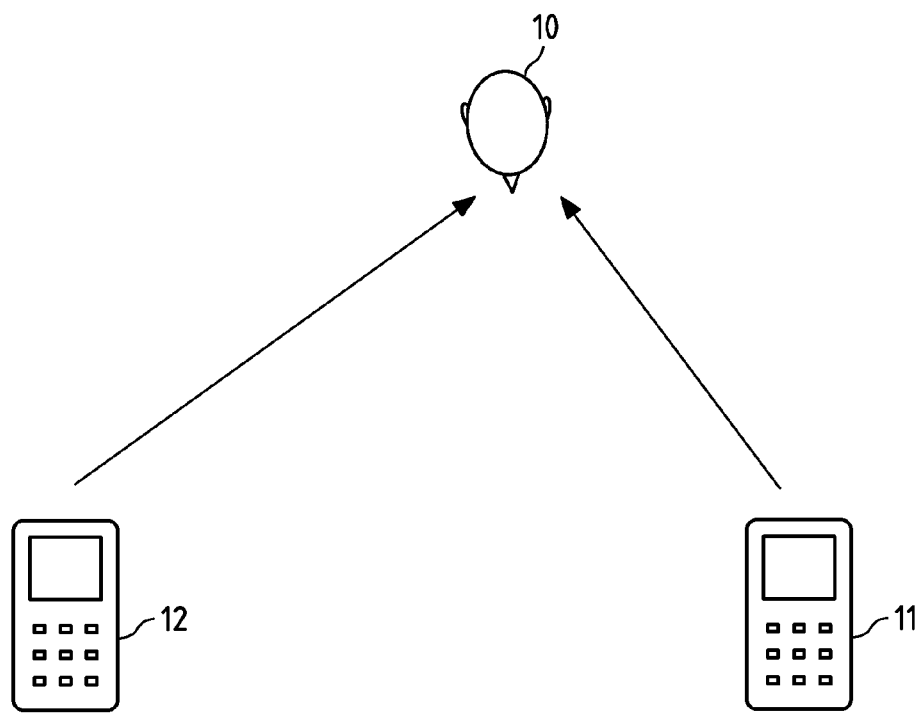
FIG. 11: a schematic illustration of a reception of signals from a single sound source by a first-type device and a second-type device according to an embodiment of the present invention.

FIG. 11 presents an example scenario in which the second-type device 12 has gained an accurate location and orientation information using GPS and compass information. In addition, the DoA of the audio source 10 (which is—as an example—considered to be a human speaker here) is detected by both the second-type device 12 and the first-type device 11. Both devices 11 and 12 provide their information to the location server in which the audio analysis is done based on the given location and orientation information of the second-type device 12 and the audio source DoA detected in both devices 11 and 12.

Figure 12:
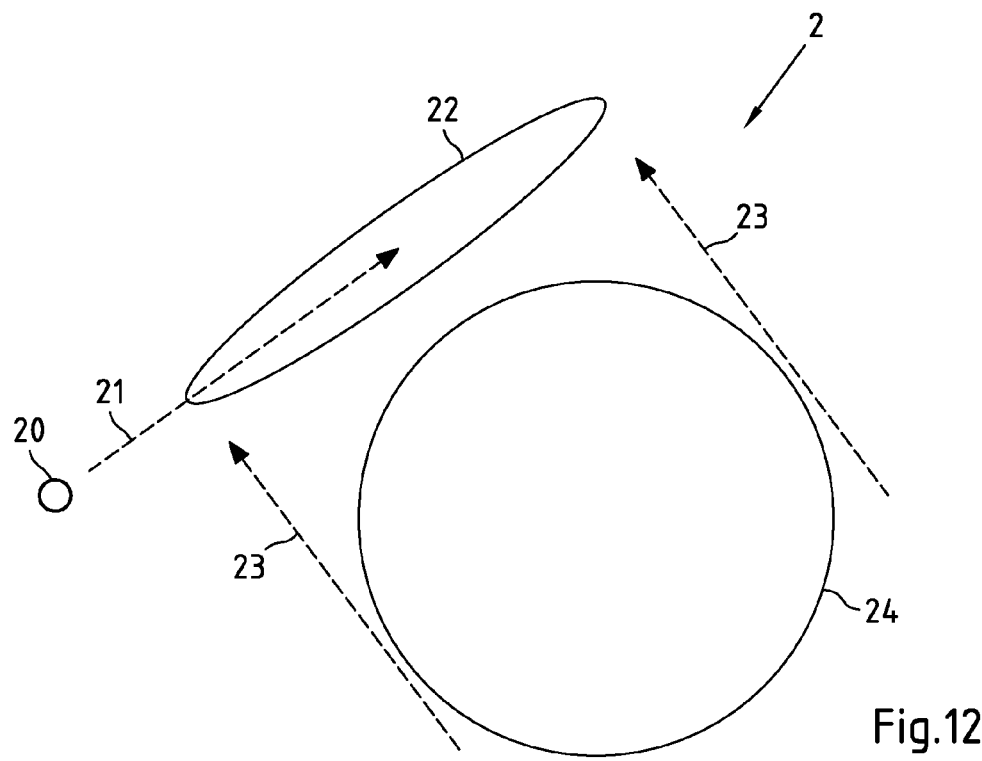
FIG. 12: a schematic illustration of an example for estimating the location of the first-type device of FIG. 11 according to an embodiment of the present invention in case that the orientation of the first-type device is known.

FIG. 12 is a schematic illustration of an example for estimating the location of the first-type device of FIG. 11 according to an embodiment of the present invention under the assumption that the orientation of the first-type device 11 is known. Based on the location 20 of the second-type device and on the estimated direction 21 between the second-type device and the audio source (and an estimated or assumed distance between the second-type device and the audio source), a location estimate 22 for the audio source is determined. If the audio source would be comprised in the first-type device, the position relationship between the first-type device and the audio source would be a priori known and would be that both positions (at least substantially) collocate, and then location estimate 22 for the audio source would also represent the location estimate for the first-type device.

In FIG. 12, the location estimate 22 is depicted as an area rather than a point to indicate an inherent estimation uncertainty. This area reflects an uncertainty of the direction estimate and an uncertainty of the distance estimate. The uncertainty (e.g. width) of the direction estimate is proportional to the inter channel coherence of the signal in the given direction (The higher the correlation, the smaller the uncertainty of the direction estimate. Low correlation, which for instance occurs for far away sources, thus means a "blurred" location estimate (with reverberation etc)).

Since the uncertainty of the distance estimate is considered to be larger than the uncertainty of the direction estimate, the location estimate 22 is schematically illustrated as an ellipse in FIG. 12 Alternatively, for instance also a cone-shaped location estimate or a location estimate with a different shape could be used in FIG. 12.

The relative direction between this audio source and the first-type device has also been estimated by the first-type device as a position relationship. Therein, since the orientation of the first-type device is known (it is presently the same as that of the second-type device), this relative direction can be transformed into the absolute direction 23 that uses the same coordinate system as the direction 21 and the location estimate 22. By combining the location estimate 22 and the position relationship represented by direction 23, a constraint 24, i.e. a location estimate 24 of the first-type device, can be obtained. Since in the present example, initially not even a coarse location estimate for the first-type device is available, there is no anchor point for the direction 23, so that this direction 23 has to be represented by a plurality of parallel directions 23 (two of which are shown in FIG. 12). However, since the extension of the location estimate 22 for the audio source is limited, the location estimate 24 can be obtained by fitting two directions 23 at the outer ends of location estimate 22 and assuming the location estimate 24 to be located between these two directions 23, wherein in the present example, a circular location estimate 24 is assumed.

As can be seen from the example of FIG. 12, when only detecting the direction of a single audio source within the audio image, only a rather rough location estimate 24 of the first-type device is obtained, even if both the first-type device and the second-type device know their (relative) orientation.

It should be noted that, if the orientation of the first-type device would not be known, one audio source does not provide any information about the location of the first-type device, since, depending on the actual orientation of the first-type device, the first-type device may in principle locate anywhere relative to the second-type device.

Furthermore, even when the orientation of the first-type device is known (as in the example of FIG. 12), the fact that the DoA-estimation does not provide any information about the actual distance between the audio source and the microphone array may cause some uncertainty to the collaborative location estimation of the first-type device. Thus, although the DoA is known accurately, the audio source can locate on any position along the DoA line 21 seen by the second-type device as shown in FIG. 12.

However, to mitigate this effect, the maximum distance to the audio source may be determined based on the microphone array sensitivity (since this sensitivity may be representative of the maximum possible distance between an audio source and the microphone array, because farther located audio sources may no longer be received). Furthermore, audio sources far away from the device do not necessarily produce an accurate (and thus applicable) DoA estimate anyway.

It should be noted that the collaborative estimation of the position of a first-type device according to the present invention also works if the second-type device is not capable of estimating a direction towards a signal source, for instance if it only has a single sensor/microphone. In this case, also knowledge of the orientation of the second-type device is not necessary. In this case, based on the known location of the second-type device, and a determined or assumed distance towards the sound source, a circular location estimate for the sound source can be set up centred at the location of the second-type base station, and this circular location estimate can then be used together with the estimated position relationship between the first-type device and this sound source to estimate the position of the first-type device. Therein, the position relationship between the first-type device and this sound source may also only be based on a determined or assumed distance between the first-type device and the sound source, or on a direction (and optionally a distance) estimate together with knowledge on the orientation of the first-type device. The resulting estimates of the location of the first-type device may be somewhat coarse, but may nevertheless be useful depending on the application field.

It should also be noted that exploitation of signals received from the same sound source at at least two second-type devices with known locations may allow dispensing with the requirement that the orientation of the second-type devices has to be known. For instance, if the location of each second-type device, the respective directions towards the sound source and the respective distances are known, a location estimate for the sound source can be determined without requiring the orientation of the second-type devices to be known. The accuracy of the location estimate for the signal source further improves if more than one signal source are received by the second-type devices. This will be discussed further below, where it is however assumed that the orientation of the second-type device(s) is known.

Returning to the examples of FIGS. 11 and 12 above, remember that the DoA estimation in these examples was only detecting a single audio source. However, the same parameterisation could be used for multiple audio sources (and also other signal sources) as well. Therein, these audio sources or signal sources may at least partially be comprised in the first-type device itself.

Statistical analysis of the cues could reveal that the audio scene may contain more than one source. For example, the spatial audio cues across frequency bands could be clustered in an arbitrary number of subsets using for example Gaussian Mixture Models (GMM).

The achieved DoA cues can be classified within M Gaussian mixtures by determining the Probability Density Function (pdf) function of the DoA data for each sub band $$f_{X|\theta}(\phi|\theta) = \sum_{i=1}^{M} \rho_i f_{X|\theta_i}(\phi|\theta_i), \qquad (10)$$

where $\rho_i$ is the component weight and components are Gaussian $$f_{X|\theta_i}(\phi|\theta_i) = \frac{1}{\sigma_i \sqrt{2\pi}} e^{-(\phi-\mu_i)^2/2\sigma_i^2}, \qquad (11)$$

with mean $\mu_i$, variance $\sigma_i^2$ and DoA cue $\phi$. $\theta$ stands for the input parameters of the pdf function, i.e. $\theta$ contains the mean and variance.

For example, an Expectation-Maximisation (EM) algorithm could be used for estimation of the component weight, mean and variance parameters for each mixture in iterative manner using the achieved data set. For this particular case, the main interest lies in the mean parameter for each Gaussian mixture since it gives the estimate of the DoA of a plurality of sound sources. Since the number of mixtures is most likely greater than the actual number of sound sources within the sound image, it may be beneficial to concentrate on the parameters having greatest component weight and lowest variance since they can be considered to indicate strong point-like sound sources. Mixtures having mean values close to each other could also be combined, for instance based on the assumption that they do represent the same source.

Furthermore, the parameterisation could contain classification information about the content. For the location estimation purpose, the sound sources in the given directions should be identified (for instance based on the received signals stemming from these sound sources). Both devices, the first-type device and the second-type device, should distinguish the sound sources (or at least the received signals) and know which source is in which direction. In addition to spectral differences of the sources, temporal classification could also be used to distinguish sources with different DoA.

The estimation accuracy of the location and the orientation may be improved significantly when more than one audio source are detected. When clustering the determined spatial audio image cues and thus detecting two or more separate audio sources near the device, the location/orientation estimation can be made more accurate.

However, the accuracy may depend on the detected audio image. If the image is not "rich" enough, that is, if the audio sources are not populating the image well enough, the location estimation may remain inaccurate.

Figure 13:
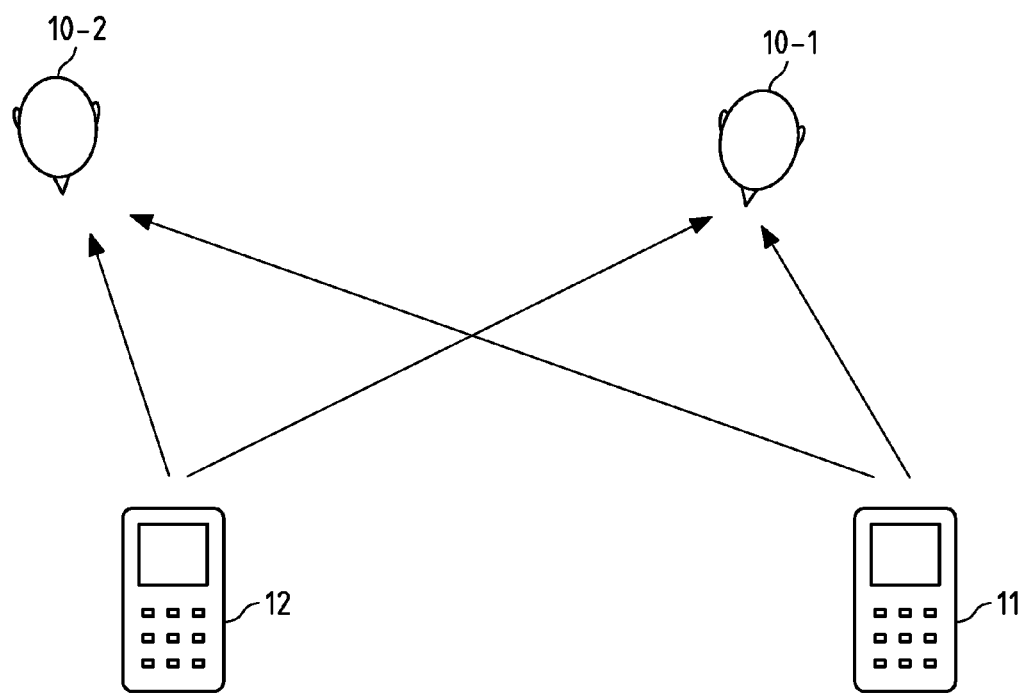
FIG. 13: a schematic illustration of a reception of signals from two sound sources by a first-type device and a second-type device according to an embodiment of the present invention.

FIG. 13 presents an example case where two separate audio sources 10-1 and 10-2 are identified in the audio image. Using the information about the DoAs of several audio sources limits the space in which the first-type device 11 can locate.

Figure 14:
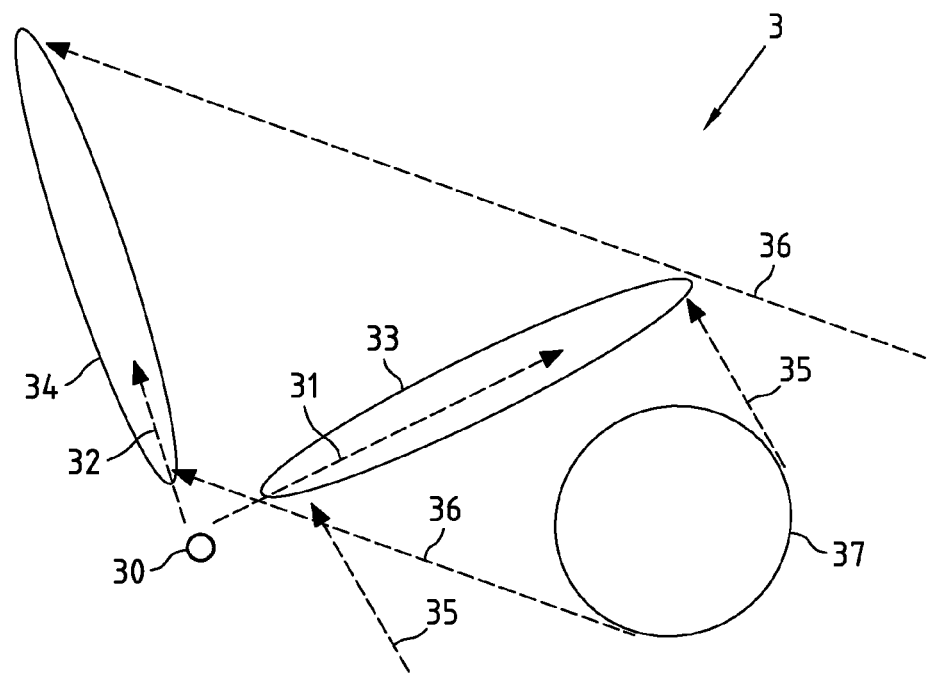
FIG. 14: a schematic illustration of an example for estimating the location of the first-type device of FIG. 13 according to an embodiment of the present invention in case that the orientation of the first-type device is known.

The corresponding improved location estimation is illustrated in FIG. 14. Therein, it is once again assumed that the orientation of the first-type device is known via sensory information. If the first-type device does not have a priori knowledge about the orientation relative to the second-type device, the location estimation may be less accurate.

In FIG. 14, setting out from the location 30 of the second-type device, the orientation of the second-type device and the DoAs 31 towards the first audio source (audio source 10-1 in FIG. 13) and 32 towards the second audio source (audio source 10-2 in FIG. 13), the location estimates 33 for the first audio source and 34 for the second audio source are determined. With respect to both audio sources 10-1 and 10-2, also the first-type device has determined relative DoAs, which can be transformed into absolute directions 35 towards the first audio source 10-1 and 36 towards the second audio source 10-2, since the orientation of the first-type device is assumed to be known. Once again, location estimate 33 and the position relationship represented by direction 35 are considered to form a first audio-source-specific constraint, and location estimate 34 and the position relationship represented by direction 36 are considered to form a second audio-source-specific constraint, and by combining both constraints, the location estimate 37 of the first-type device is obtained, which is vastly improved with respect to the estimate 24 of FIG. 12 that was based on a single audio source 10 (see FIG. 11).

Thus based on audio source classification, i.e. when the content in certain directions can be distinguished, the possible location of the first-type device is significantly limited compared to the situation of having only one source. This also holds for the possible orientation of the first-type device (in case it is not known), as will be shown below.

Figure 15:
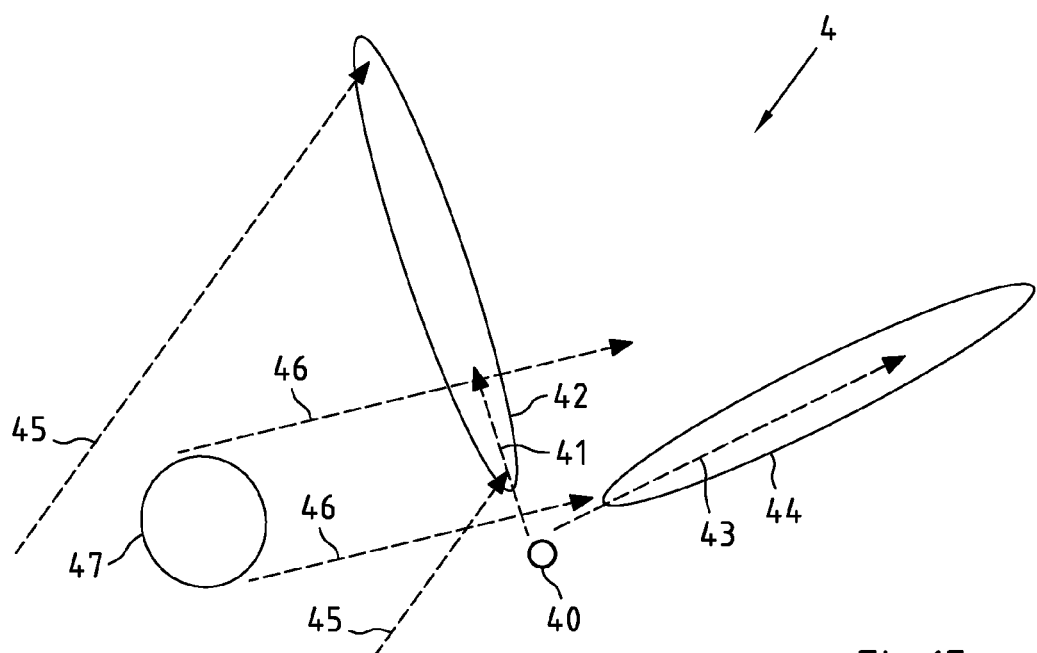
FIG. 15: a schematic illustration of an example for estimating the location of the first-type device of FIG. 13 according to an embodiment of the present invention in case that the orientation of the first-type device is not known.

FIG. 15 presents an alternative example for estimating the location/orientation of the first-type device 11 of FIG. 13, when the orientation of the first-type device is not known. This estimating, which can be considered to estimate both the location and orientation of the first-type device, or only one of them, may come to a wrong result, as can be seen by comparing the location estimate 47 obtained in FIG. 15 with the location of the first-type device in FIG. 13.

It is noted that the location 40 and orientation of the second-type device and the estimated locations 42 and 44 of the sound sources (based on the DoAs 41 and 43 estimated by the second-type device, respectively) are identical to their counterparts in FIG. 14.

Obviously, in FIG. 15, the location/orientation of the first-type device has been estimated in a valid manner (by combining the estimated DoA 46 towards the first audio source 10-1 with the location estimate 44 of this first audio source and by combining the estimated DoA 45 towards the second audio source with the location estimate 42 of this second audio source), but the resulting location estimate 47 is nevertheless wrong.

It is thus apparent that, when using only the DoAs and source classification (without knowledge on the orientation of the first-type device), the algorithm may fail. However, it is also apparent that the possible location/orientation estimates are significantly limited compared to the case where only a single audio source is considered (compare the extension of location estimate 24 of FIG. 12 and the extension of location estimate 47 of FIG. 15). For example, since the left and right hand sources, 10-2 and 10-1, respectively are distinguished, the first-type device cannot be facing the second-type device.

From the above, it is noted that the location/orientation estimation of the first-type device may be improved every time new audio sources are detected and identified.

Further collaboration could be utilised by for example by detecting the relative loudness of identified audio sources.

For instance, from the point of view of the second-type device 12 in FIG. 13, the left hand side audio source 10-2 is louder than the right hand side audio source 10-1. For the first-type device 11, the situation is reverse. Hence, by combining this information with the clustering of spatial audio cues, the server or first-type/second-type device can make an estimate about the relative distance of the audio source to the microphone array. Based on this analysis, the left hand side audio source 10-2 is considered to be closer to the second-type device 12 than the right hand side audio source 10-1.

Figure 16:
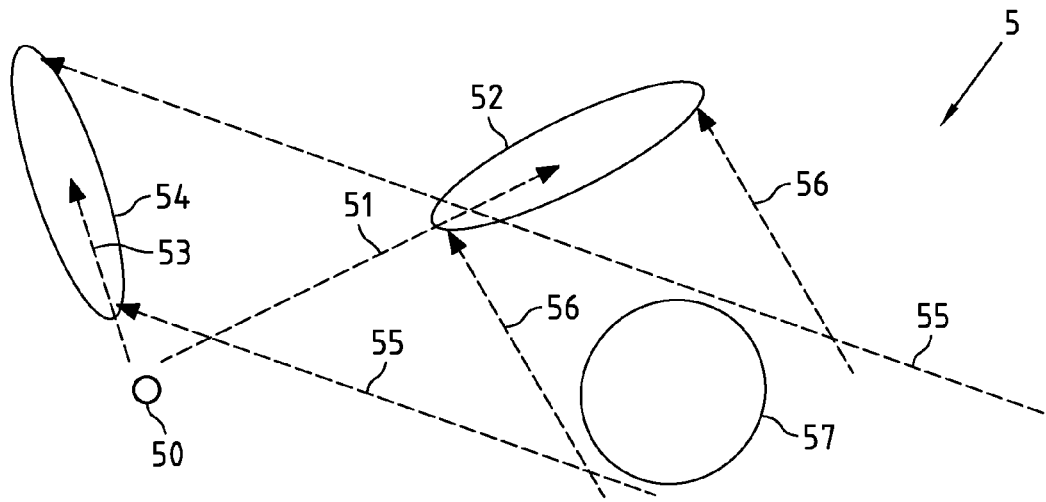
FIG. 16: a schematic illustration of an example for estimating the location of the first-type device of FIG. 13 according to an embodiment of the present invention in case that the orientation of the first-type device is known and relative loudness of the sound sources is considered.

FIG. 16 presents the according estimation result under the assumption that the orientation of the first-type device is known. It is easy to see that the location estimates 52 and 54 (which are based on the estimated DoAs 51 and 53 and the location 50 of the second-type device) of the audio sources are now very much limited to their counterparts 33 and 34 in FIG. 14. Now that the left hand side source 10-2 (see FIG. 13) is determined to be closer to the second-type device 12 the location estimate 56 of the first-type device 11 (with estimated DoAs 55 and 56 towards the audio sources) is improved again. As a result, the estimation of the first-type device with orientation knowledge is fairly accurate.

And, even when the orientation of the first-type device is not known a priori, the possible locations of the first-type device with the given information about the DoA, source classification and limited relative distances is significantly improved. In this example, the first-type device can only locate on the right side of the second-type device, and the possible orientation is also limited.

When a third audio source (or even more audio sources) is detected in the audio image and the source classification as well as relative distances can be estimated within reasonable accuracy, the location and orientation estimation of the first-type device is even more accurate than in FIG. 16.

Figure 17:
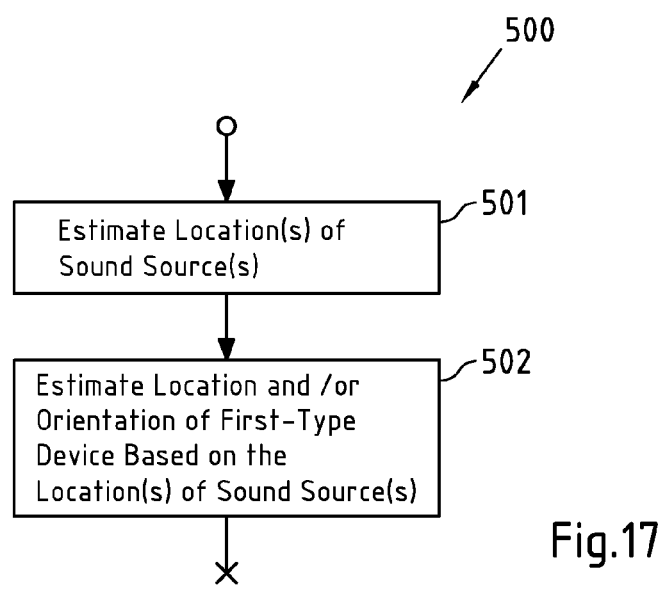
FIG. 17: a flowchart for estimating a location and/or an orientation of a first-type device according to an embodiment of the present invention.
Figure 18:
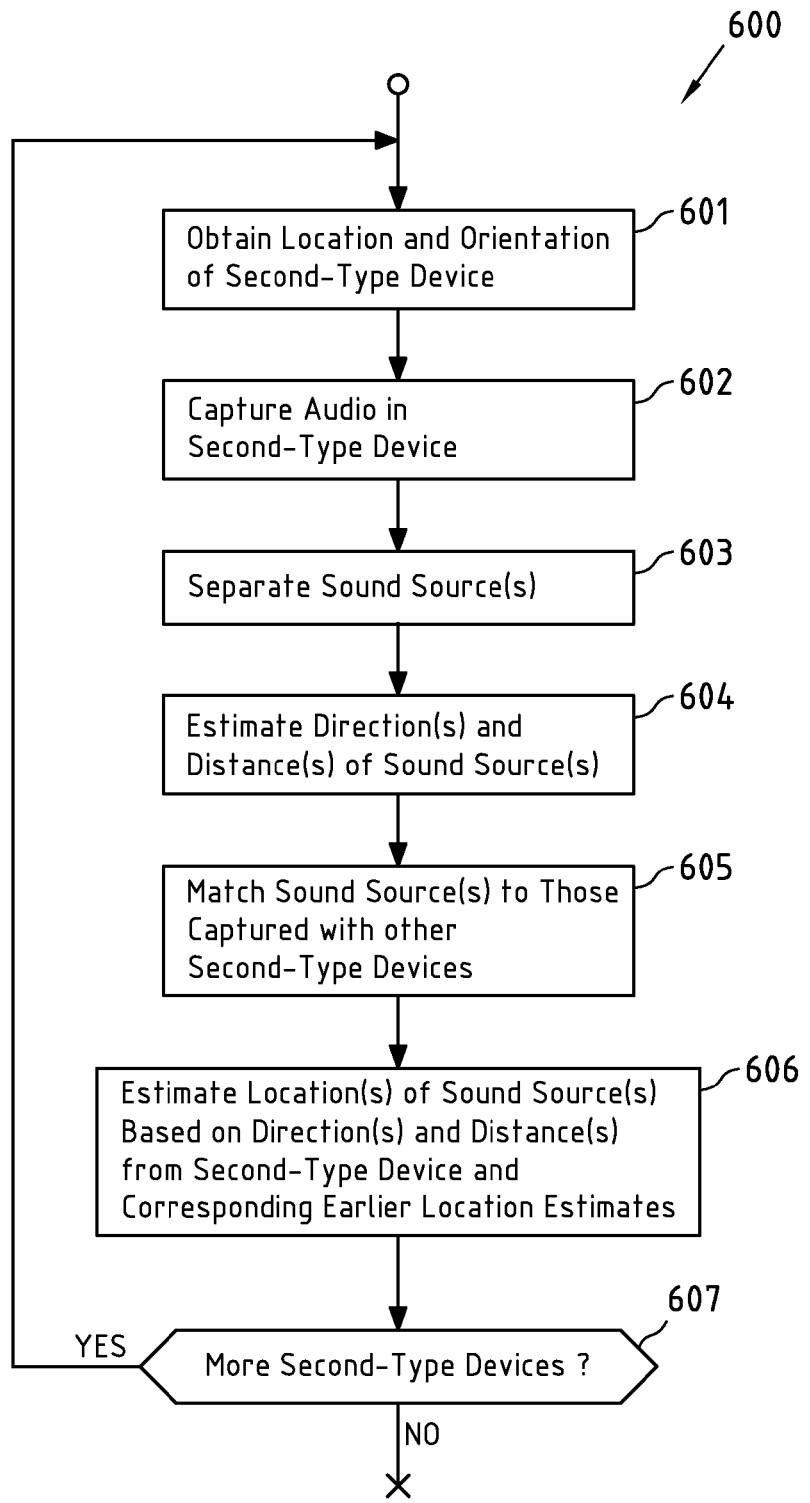
FIG. 18: a flowchart for estimating the location of sound sources (see step 501 in FIG. 17) according to an embodiment of the present invention.
Figure 19:
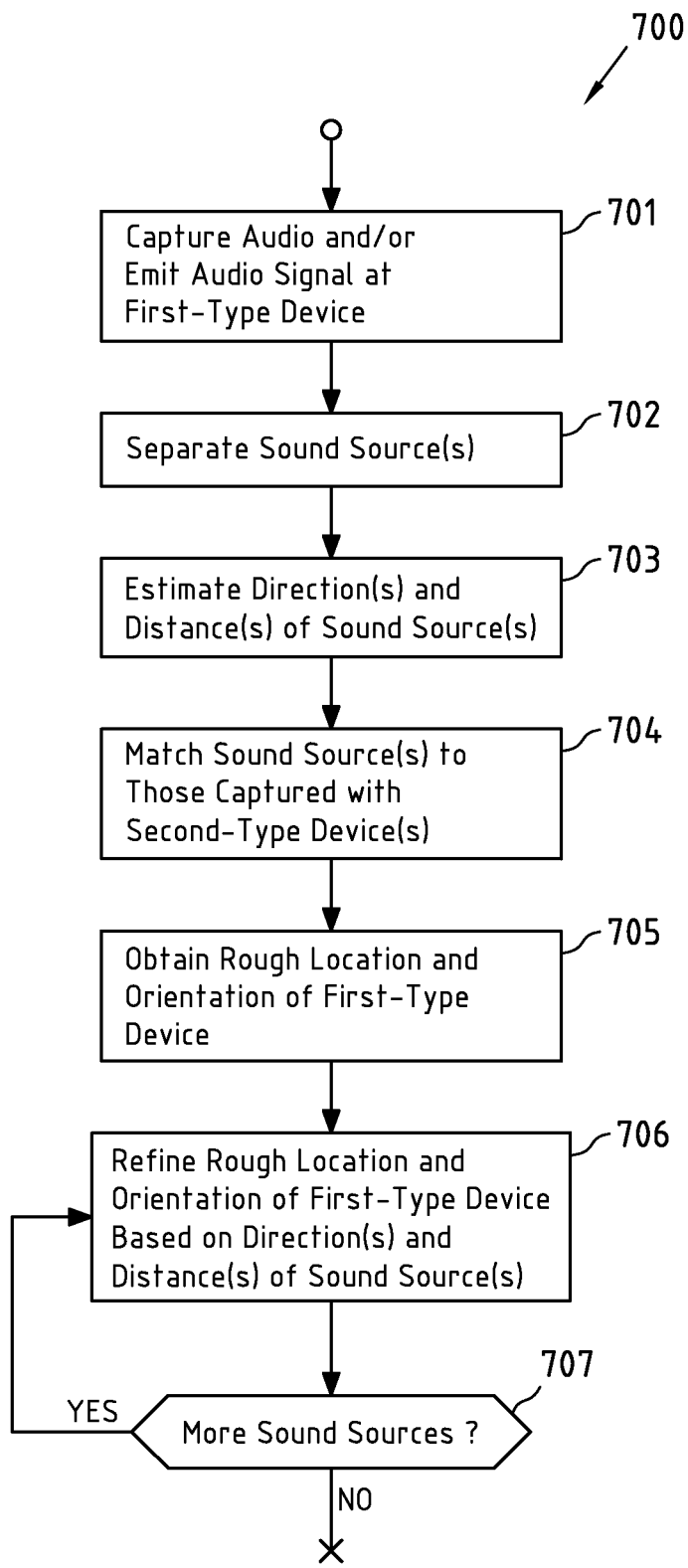
FIG. 19: a flowchart for estimating the location and/or orientation of a first-type device based on the location of sound sources (see step 502 in FIG. 17) according to an embodiment of the present invention.

In the following, with respect to the flowcharts of FIGS. 17-19, an embodiment of the process for collaboratively estimating a location and/or an orientation of a first-type device will again be explained in the context of a system that uses audio sources as signal sources. It is assumed that the second-type device(s) use microphone arrays with at least two microphones to receive respective signals from one or more audio sources and are thus capable of determining DoAs towards these audio sources. It is further assumed that the first-type device uses microphone arrays with at least two microphones to receive respective signals from one or more external audio sources and/or comprises at least one internal audio source for emitting an audio signal. Furthermore, it is assumed that the second-type devices are capable of determining their accurate location and orientation, and that both the first-type and second-type device are capable of separating multiple audio sources. The flowcharts of FIGS. 17-19 present this embodiment in closed form and are not necessarily device-specific, i.e. it may be the case that the steps of each of the flowcharts of FIGS. 17-19 are executed by different devices. Furthermore, it is readily clear that the principles of the estimation of the location and/or orientation of the first-type device described below are equally well applicable to scenarios where signal sources other than audio sources are used (for instance, electromagnetic signal sources that emit electromagnetic signals that are received with antennas).

As a start, flowchart 500 of FIG. 17 divides the estimation of the location and/or orientation of the first-type device according to an example embodiment of the present invention into two categories.

First, the respective locations of the one or more sound sources (which may be external and/or internal with respect to the first-type device) are estimated in step 501 based on the information extracted by one or more second-type devices.

Second, the location and/or orientation of the first-type device is estimated in step 502 based on the location estimate(s) for the sound source(s) derived in step 501. Steps 501 and 502 themselves contain many processing steps and are described in more detail with reference to FIGS. 18 and 19, respectively.

FIG. 18 presents the processing steps of flowchart 600 as an example for determining the location estimate(s) of the sound source(s) according to step 501 of flowchart 500 of FIG. 17. It is noted that the order of some individual steps may be altered without affecting the processing result. For example, step 601 may be alternatively placed between steps 605 and 606.

In step 601, the (absolute) location and the orientation of a second-type device is obtained. The location may for instance be gotten from GPS or through any other positioning means. The orientation may be gotten from a compass in the second-type device or through any other orientation detection means.

In step 602, an audio signal is captured through the microphones in the second-type device. Audio capturing may be consistently on, may happen periodically or according to any predetermined pattern, or may take place on request. The audio signals may stem from audio sources that are external with respect to the first-type devices and/or from audio signals that are internal with respect to the first-type device.

In step 603, the sound source(s) are detected from the captured audio signal. The sound source detection may for instance use the Gaussian Mixture Models (GMM) method presented earlier or any other suitable method.

In step 604, the direction(s) and distance(s) of the sound source(s) from the second-type device are estimated. Some methods for the direction and distance estimation have been presented above.

In step 605, the individual sound source(s) or spatial cues are matched with those captured with other second-type devices, if any. The recorded sound source(s) or spatial cues are provided, for example streamed, to a server or to other second-type devices. A cross-correlation estimate, for instance similar to Equation (2) and Equation (3), of the received sound signals or spatial cue vectors with the locally stored content will determine the matched source(s). The estimated buffering delay in each device could be taken into account when determining the corresponding audio events to assist computation of the cross-correlation estimate. In other words, the processing in step 605 results into pair-wise identification which sound source in the current audio signal of the current second-type device is likely to be the same as a particular sound source detected from other second-type devices.

In step 606, the location of the sound source(s) is estimated based on the estimated direction(s) and distance(s) from the second-type device and the location estimate(s) obtained from processing the information from other second-type devices, if any. If no information of other second-type devices has been processed, the location estimate(s) are simply derived from the location and orientation of the second-type device and the direction and distance estimation(s) to the sound source(s). If an earlier location estimate for a sound source has been derived, then it is updated e.g. by taking the cross-section of the earlier location estimate and the new estimate derived from the location and orientation of the second-type device and the direction and distance estimation to the sound source.

In step 607, it is checked whether there are more second-type devices in about the same area. If there is, steps 601 to 606 are repeated for the next second-type device. Otherwise, the location estimates for the sound sources are not refined further.

FIG. 19 presents processing steps of flowchart 700 as an example for estimating the location of the first-type device based on the information and location estimate(s) for the sound source(s) according to step 502 of flowchart 500 of FIG. 17. It is noted that the order of some individual steps may be altered without affecting the processing result. For example, step 705 could be placed in other locations of the processing chain, such as preceding step 701.

In step 701, respective audio signals from one or more external audio sources are captured through the microphones in the first-type device, and/or an audio signal is emitted by an internal audio source comprised in the first-type device. Audio capturing may be consistently on, may happen periodically or according to any predetermined pattern, or may take place on request. If both capturing of one or more external audio sources and emission of an audio signal by an internal audio source is performed, these actions may take place simultaneously. Alternatively, capturing of one or more external audio sources and emission of an audio signal by an internal audio source may for instance be separated in the time domain to avoid mutual interference; for instance, first the emission of the audio signal by the internal audio source may be performed, for instance for a pre-defined time, and then the capturing of the external audio source(s) may be performed.

In steps 702, 703 and 704, the one or more individual external sound sources are detected from the captured audio signal (if audio capture has taken place in step 701), the respective directions and distances of the one or more external sound sources are estimated (if audio capture has taken place in step 701), and the external and/or internal sounds sources are matched to those captured by the second-type device(s). Steps 702, 703 and 704 include similar processing to steps 603, 604 and 605 of flowchart 600 of FIG. 18, respectively, and are therefore not described here in detail.

In step 705, a rough location and orientation of the first-type device is obtained, if possible. A rough location may for instance be obtained through the cell-ID of the cellular network in use, for example. A rough orientation may be obtained through sensors available in the device, for example. The rough location and orientation are used as an initial constraint for audio-based derivation of location estimates. It is not mandatory that either or both of location and orientation estimate are derived. However, initial rough estimates can make the audio based location estimation more accurate as described earlier.

In step 706, the current location and orientation estimates of the first-type device are refined based on the estimated direction(s) and distance(s) towards the sound source(s). The location estimate(s) for the sound source(s) have been determined in step 501 of flowchart 500 of FIG. 17. Given the estimated direction(s) and distance(s) between the external sound source(s) and the first-type device (i.e. estimated position relationship(s)) as well as the rough orientation of the first-type device, if available, and/or the a priori known position relationship between the internal sound source and the first-type device, a candidate area of the location of the first-type device can be derived.

The current location estimate for the first-type device can be formed as a cross-section of the candidate area and an earlier location estimate.

The current orientation estimate of the first-type device can be formed by excluding those orientations that are not consistent with the earlier orientation estimate(s), the current location estimate, the detected sound source directions, and the estimated locations of the sound sources.

It is noted that both the location estimate and the orientation estimate may typically be inaccurate and may be expressed as an area and a range, respectively, and may also be associated with probability distribution function across the area and the range, respectively.

In step 707, it is checked if there are more (external) sound sources available. If there is, then the step 706 is repeated for the next sound source. If there are no more sound sources, then the location and/or orientation estimates of the first-type device cannot be refined anymore.

Figure 20:
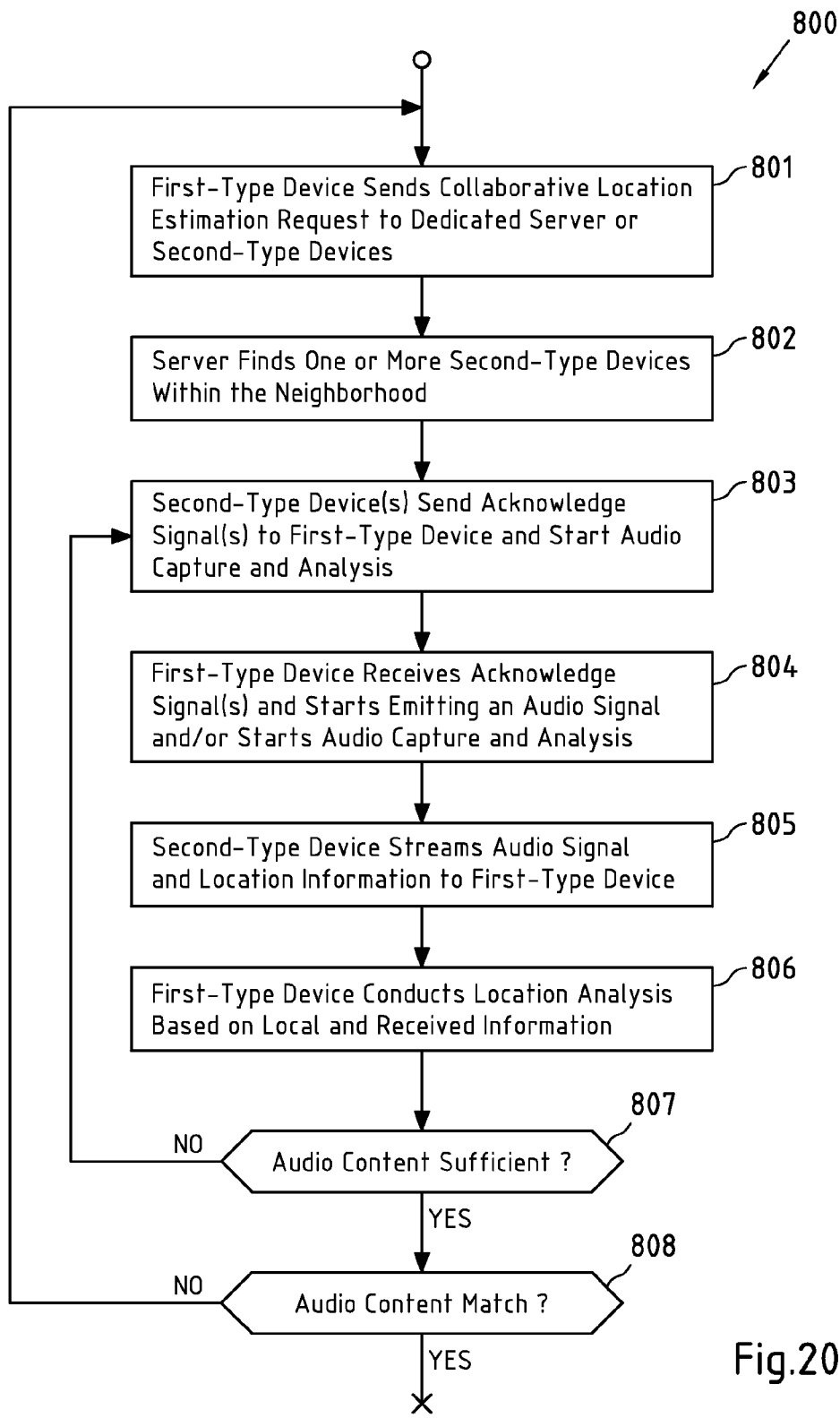
FIG. 20: a flowchart of a protocol for location and/or orientation estimation according to an embodiment of the present invention.

Finally, with respect to FIG. 20, an example of a protocol that controls the interaction between the first-type device and the second-type device (and the server, if any) for collaborative location and/or orientation estimation.

The collaborative location estimation is most likely initiated by a first-type device not having accurate means for position sensing.

In a step 801, the first-type device sends (e.g. broadcasts) a collaborative location estimation request to a server or to second-type devices available in the neighborhood, e.g. to those having the same cell ID.

In case the server is requested for location assistance, the server makes an enquiry for available second-type devices. Alternatively, the server may have fixed devices within the given location (step 802).

When accepting the request, the second-type device(s) start recording the audio signal and analysing the location of the sound sources (step 803).

At the same time, the first-type device gets a respective acknowledgement from the accepting second-type device(s) (step 804) directly or via a server. In response to the acknowledgement(s), the first-type device triggers its internal audio source to emit a signal (if such an internal audio source is available) and/or starts capture and analysis of signals from one or more external audio sources (if a sensor for receiving such signals from external audio sources is available).

For instance after a predetermined time, (or also after being triggered), the second-type device(s) provide the recorded audio files, the analysis results and the accurate location and orientation cues either directly to the first-type device or via the server (step 805), after which the first-type device conducts the location analysis described above (step 806). Therein, if the first-type device emitted an audio signal in step 804 itself, i.e. if the first-type device comprises an audio source, this information is considered in the analysis of step 806.

The predetermined recording time could be extended, or an additional recording and analysis session could be performed, when the achieved content was not rich enough, i.e. it did not contain sufficient number of sound sources (step 807).

The delivery, e.g. streaming, of audio and location information could also be continuous until the location of the first-type device is estimated with sufficient accuracy, or the action is cancelled. When the audio content from the one or more second-type device does not match the content recorded and/or emitted by the first-type device, the conclusion could be that the second-type device is not in the same audio environment with the first-type device. In that case, another request could be sent or broadcasted to find other second-type devices within the neighborhood (step 808).

In one embodiment of the invention, both the first-type device and the second-type device(s) will provide, e.g. stream, the captured audio content and the available location information to the collaborative location estimation server which is then conducting the location analysis of the first-type device.

In another embodiment of the invention, the second-type device(s) and/or server(s) capable for the collaborative location estimation are searched within an ad-hoc network or wireless sensor network the first-type device connected to via WLAN, Bluetooth or any other type of radio link.

It is noted that those location estimation techniques presented above that are not based on reception of audio signals (for instance the location estimation techniques based on GNSS, triangulation or cell-IDs that are for instance used to determine the location of the second-type device) are given just as examples. Other location estimation techniques can be used before the above presented collaborative (e.g. audio-based) location estimation or may assist this location estimation.

For example, it is known that the location and/or orientation of a device can be estimated based on images or video captured with the device. Feature points of a captured image are then extracted and matched with those available in the 3D model of the surroundings. The location and orientation of the device can be estimated by matching several feature points to the respective feature points of the 3D model of the surroundings. Such visual localization can be used to refine the location and orientation estimate of the second-type device. Furthermore, such visual localization can be used to refine the initial rough estimate of the location and orientation of the first-type device. It is noted that if no 3D model of the surroundings is readily available (e.g. through a 3D map service), feature points extracted from images of second-type devices and first-type devices can be matched, and a 3D point cloud be generated accordingly. However, such a point cloud may usually not be in scale, i.e. the absolute distances of the devices relative to each other or relative to the objects in the images may not be derivable. The presented collaborative (e.g. audio-based) location estimation can be used in determining the scale for visual 3D model.

As has been described above, embodiments of the present invention allow obtaining an accurate location estimate for a (first-type) device without expensive and/or power-consuming GNSS functionality or other expensive and/or power-consuming localization sensors. This can potentially enable location based services for low-end phones without GNSS. To this end, device location estimation is done collaboratively using the available accurate information of one device and processing the common sensory information available for everyone. In embodiments of the present invention, using the common audio scene information, such as increasing number of discrete sources and relative loudness of the sources seen by different devices, the location estimation can be iteratively improved when more information is retrieved. In embodiments of the present invention, the collaborative location estimation can be done in centralised service or within an ad-hoc type network among the collaborating devices. In embodiments of the present invention, the computational load can be distributed to the server by transmitting an audio clip instead of conducting the audio scene analysis within the devices. In embodiments of the present invention, the user privacy may not be compromised if scrambled audio data is used for the scene analysis in the server (i.e. the captured audio clips are transmitted in scrambled form to the server or devices). In embodiments of the present invention, the second-type device could be a fixed system within the place of interests with a priori location and orientation information.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
   (i) to a combination of processor(s) or
   (ii) to portions of processor(s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should also be understood that the sequence of method steps in the flowcharts presented above is not mandatory, also alternative sequences may be possible.

The invention claimed is:

1. A method for estimating at least one of a location or an orientation of a first-type device, the method comprising:
   receiving
      respective location estimates for one or more signal sources, wherein at least one location estimate for a signal source of said one or more signal sources is determined at least based on respective signals from said signal source received at one or more second-type devices and respective locations of said one or more second-type devices, and
      respective position relationships between said one or more signal sources and said first-type device;
   estimating, by the processor, at least one of the location or the orientation of said first-type device at least based on the respective location estimates for the one or more signal sources and the respective position relationships between said one or more signal sources and said first-type device,
   wherein said respective location estimates for said one or more signal sources are determined at least based on said respective locations of said one or more second-type devices, respective orientations of said one or more second-type devices and respective estimates of respective directions between said signal sources and said one or more second-type devices determined at least based on the respective signals received at said one or more second-type devices.

2. The method according to claim 1, wherein said one or more signal sources are sound sources that emit respective audio signals.

3. The method according to claim 1, wherein said at least one location estimate for said signal source is determined further based on respective estimates of respective distances between said signal source and said one or more second-type devices.

4. The method according to claim 1, wherein said at least one location estimate for said signal source is determined further based on at least one previously determined location estimate for said signal source.

5. The method according to claim 1, wherein said at least one location estimate for said signal source is determined further based on level differences between respective signals from at least two of said one or more signal sources received at a second-type device of said one or more second-type devices.

6. The method according to claim 1, wherein said respective signals received at said second-type devices are analyzed to decide if they stem from the same signal source and are thus jointly useable as a basis for determining said at least one location estimate for said signal source.

7. The method according to claim 1, wherein at least one of said one or more signal sources is comprised in said first-type device, and wherein a position relationship between said at least one signal source comprised in said first-type device and said first-type device is known a priori.

8. The method according to claim 7, wherein said estimating of said at least one of said location and said orientation of said first-type device is performed by said first-type device.

9. The method according to claim 8, further comprising:
   receiving, at said first-type device, one of said respective location estimates for said one or more signal sources and information based on which said respective location estimates for said one or more signal sources are derivable from at least one of said one or more second-type devices and a service to which said one or more second-type devices provided one of said respective location estimates for said one or more signal sources and information based on which said respective location estimates for said one or more signal sources are derivable.

10. An apparatus for estimating at least one of a location or an orientation of a first-type device, the apparatus comprising at least one processor; and at least one memory including computer program code, said at least one memory and said computer program code configured to, with said at least one processor, cause said apparatus at least to:

receive
    respective location estimates for one or more signal sources, wherein at least one location estimate for a signal source of said one or more signal sources is determined at least based on respective signals from said signal source received at one or more second-type devices and respective locations of said one or more second-type devices, and
    respective position relationships between said one or more signal sources and said first-type device;
estimate at least one of the location or the orientation of said first-type device at least based on the respective location estimates for the one or more signal sources and the respective position relationships between said one or more signal sources and said first-type device,
wherein said respective location estimates for said one or more signal sources are determined at least based on said respective locations of said one or more second-type devices, respective orientations of said one or more second-type devices and respective estimates of respective directions between said signal sources and said one or more second-type devices determined at least based on the respective signals received at said one or more second-type devices.

11. The apparatus according to claim 10, wherein said apparatus is said first-type device or a part thereof.

12. A method comprising:
receiving, at a first-type device, a signal from a signal source of one or more signal sources to serve as an at least partial basis for estimating a position relationship between said signal source and said first-type device, and
communicating information related to said signal received at said first-type device from said first-type device to one of a service or a second-type device,
wherein an estimate of at least one of a location or an orientation of said first-type device is derivable at least based on respective position relationships between said one or more signal sources and said first-type device and respective location estimates for said one or more signal sources,
wherein at least one location estimate for a signal source of said one or more signal sources is determinable at least based on respective signals from said signal source received at one or more second-type devices and respective locations of said one or more second-type devices, and
wherein at least one of said service or said second-type device is configured to estimate said at least one of said location and said orientation of said first-type device based on said information related to said signal received at said first-type device and said respective location estimates for said one or more signal sources.

13. An apparatus comprising at least one processor; and at least one memory including computer program code, said at least one memory and said computer program code configured to, with said at least one processor, cause said apparatus at least to
receive, at a first-type device, a signal from a signal source of one or more signal sources to serve as an at least partial basis for estimating a position relationship between said signal source and said first-type device, and
communicate information related to said signal received at said first-type device from said first-type device to at least one of a service or a second-type device of said second-type devices,
wherein an estimate of at least one of a location or an orientation of said first-type device is derivable at least based on respective position relationships between said one or more signal sources and said first-type device and respective location estimates for said one or more signal sources,
wherein at least one location estimate for a signal source of said one or more signal sources is determinable at least based on respective signals from said signal source received at one or more second-type devices and respective locations of said one or more second-type devices, and
wherein at least one of said service or said second-type device estimates is configured to estimate said at least one of said location or said orientation of said first-type device based on said information related to said signal received at said first-type device and said respective location estimates for said one or more signal sources.

14. A method comprising:
receiving, at a second-type device of one or more second-type devices, a signal from a signal source of one or more signal sources to serve, together with at least a location of said second-type device, as an at least partial basis for determining a location estimate for said signal source, and
determining, by a processor, a location estimate for said signal source based at least in part on the signal from the signal source,
wherein said location estimate for said signal source is determined at least based on said respective locations of said one or more second-type devices, respective orientations of said one or more second-type devices, and respective estimates of respective directions between said signal source and said one or more second-type devices determined at least based on said respective signals received at said one or more second-type devices, and
wherein an estimate of at least one of a location or an orientation of a first-type device is derivable at least based on respective location estimates for said one or more signal sources, and respective position relationships between said one or more signal sources and said first-type device.

15. The method according to claim 14, further comprising:
communicating information related to said signal received at said second-type device from said second-type device to one of a service, said first-type device and another second-type device,
wherein said one of said service, said first-type device and said other second-type device is configured to estimate said at least one of said location and said orientation of said first-type device based on said information related to said signal received at said second-type device and said respective position relationships between said one or more signal sources and said first-type device.

16. An apparatus comprising at least one processor; and at least one memory including computer program code, said at least one memory and said computer program code configured to, with said at least one processor, cause said apparatus at least to
receive, at a second-type device of one or more second-type devices, a signal from a signal source of one or more signal sources to serve, together with at least a location of said second-type device, as an at least partial basis for determining a location estimate for said signal source,
determine a location estimate for said signal source based at least in part on the signal from the signal source, wherein said location estimate for said signal source is determined at least based on said respective locations of said one or more second-type devices, respective orientations of said one or more second-type devices, and respective estimates of respective directions between said signal source and said one or more second-type devices determined at least based on said respective signals received at said one or more second-type devices, and wherein an estimate of at least one of a location or an orientation of a first-type device is derivable at least based on respective location estimates for said one or more signal sources, and respective position relationships between said one or more signal sources and said first-type device.

17. The apparatus according to claim 16, wherein said at least one memory and said computer program code are further configured to, with said at least one processor, cause said apparatus to communicate information related to said signal received at said second-type device from said second-type device to one of a service, said first-type device and another second-type device, wherein said one of said service, said first-type device and said other second-type device is configured to estimate said at least one of said location and said orientation of said first-type device based on said information related to said signal received at said second-type device and said respective position relationships between said one or more signal sources and said first-type device.

* * * * *